(12) United States Patent
Kusashima

(10) Patent No.: US 11,856,583 B2
(45) Date of Patent: Dec. 26, 2023

(54) WIRELESS COMMUNICATION DEVICE, WIRELESS COMMUNICATION METHOD, AND COMPUTER PROGRAM

(71) Applicant: Sony Corporation, Tokyo (JP)

(72) Inventor: Naoki Kusashima, Tokyo (JP)

(73) Assignee: Sony Corporation, Tokyo (JP)

(*) Notice: Subject to any disclaimer, the term of this patent is extended or adjusted under 35 U.S.C. 154(b) by 423 days.

(21) Appl. No.: 17/261,579

(22) PCT Filed: Aug. 1, 2019

(86) PCT No.: PCT/JP2019/030131
§ 371 (c)(1),
(2) Date: Jan. 20, 2021

(87) PCT Pub. No.: WO2020/031820
PCT Pub. Date: Feb. 13, 2020

(65) Prior Publication Data
US 2021/0266881 A1    Aug. 26, 2021

(30) Foreign Application Priority Data

Aug. 9, 2018   (JP) ................................. 2018-150340

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0048* (2013.01); *H04W 16/14* (2013.01); *H04W 72/0446* (2013.01)

(58) Field of Classification Search
CPC ... H04L 27/2613; H04L 5/001; H04L 5/0048; H04L 5/005; H04L 5/0053; H04W 16/14; H04W 72/0446; H04W 72/23
See application file for complete search history.

(56) References Cited

U.S. PATENT DOCUMENTS

2009/0203309 A1\*  8/2009  Okuda ............... H04B 7/15542
                                                                                                  455/7
2017/0215202 A1\*  7/2017  Yang ..................... H04W 72/20
(Continued)

FOREIGN PATENT DOCUMENTS

WO    WO-2018074068 A1 \*  4/2018  ........... H04L 5/0051

OTHER PUBLICATIONS

Nokia, Nokia Shanghai Bell; "Frame structure for NR-U operation" Agenda item: 7.6.2 3GPP TSG RAN WG1 Meeting #93 Busan, Korea, May 21-25, 2018 R1-1806105 (Year: 2018).\*

(Continued)

*Primary Examiner* — Gary Mui
(74) *Attorney, Agent, or Firm* — XSENSUS LLP

(57) ABSTRACT

To provide a wireless communication device which enables reliable detection of a downlink without using a CRS. There is provided a wireless communication device including a communication unit (220) configured to perform wireless communication using an unlicensed band, and a detecting unit (241) configured to detect a downlink on the basis of a second downlink signal different from a first downlink signal which is periodically transmitted, in which the detecting unit starts PDCCH monitoring after detecting a downlink.

3 Claims, 27 Drawing Sheets

(51) Int. Cl.
*H04W 16/04* (2009.01)
*H04L 27/26* (2006.01)
*H04W 16/14* (2009.01)
*H04W 72/0446* (2023.01)

(56) References Cited

U.S. PATENT DOCUMENTS

| | | | |
|---|---|---|---|
| 2017/0223743 A1* | 8/2017 | Lin | H04L 27/2614 |
| 2017/0251454 A1* | 8/2017 | Yang | H04L 5/0048 |
| 2017/0347270 A1 | 11/2017 | Iouchi | |
| 2018/0054342 A1 | 2/2018 | Nory | |
| 2018/0324804 A1* | 11/2018 | Aiba | H04W 72/0453 |
| 2019/0313411 A1* | 10/2019 | Ly | H04W 72/0453 |
| 2019/0313455 A1* | 10/2019 | Guey | H04W 74/006 |
| 2019/0349154 A1* | 11/2019 | Tsai | H04W 72/21 |
| 2020/0260393 A1* | 8/2020 | Zhang | H04W 56/001 |
| 2021/0092779 A1* | 3/2021 | Tang | H04L 27/0006 |
| 2021/0368541 A1* | 11/2021 | Hedayat | H04L 5/0091 |

OTHER PUBLICATIONS

Ericsson: "PRACH Design for Enhanced LAA", 3GPP Draft; R1-163148, 3rd Generation Partnership Project (3GPP), Mobile Competence Centre ; 650, Route Des Lucioles ; F-06921 Sophia-Antipolis Cedex ; France vol. RAN WG1, No. Busan, Korea; Apr. 11, 2016-Apr. 15, 2016 Apr. 2, 2016 (Apr. 2, 2016), XP051080562, Retrieved from the Internet: URL: http://www.3gpp.org/ftp/tsg_ran/WG1_RL1/TSGR1_84b/Docs/ [retrieved on Apr. 2, 2016] *paragraph [2 . 1. 2] • paragraph [2 . 1. 3]*.

NTT Docomo et al: "RAN WG's progress on NR WI in the October meeting 2017", 3GPP Draft; R2-1712305, 3rd Generation Partnership Project (3GPP), Mobile Competence Centre ; 650, Route Des Lucioles ; F-06921 Sophia-Antipolis Cedex ; France vol. RAN WG2, No. Reno, USA; Nov. 27, 2017-Dec. 1, 2017 Nov. 17, 2017 (Nov. 17, 2017), XP051371392, Retrieved from the Internet: URL:http://www.3gpp.org/ftp/tsg%5Fran/WG2%5FRL2/TSGR2%5F100/Docs/ [retrieved on Nov. 17, 2017] * p. 12 *.

International Search Report and Written Opinion dated Oct. 1, 2019, received for PCT Application PCT/JP2019/030131, Filed on Aug. 1, 2019, 9 pages including English Translation.

Nokia et al., "On DL Signals and Channels for NR-U", 3GPP TSG RAN WG1 Meeting #93, R1-1806106, May 21-25, 2018, 8 pages.

Qualcomm Incorporated, "DL Signals and Channels for NR-U", 3GPP TSG RAN WG1 Meeting #93, R1-1807387, May 21-25, 2018, pp. 1-10.

Interdigital Inc., "On UL Signals and Channels in NR-Unlicensed", 3GPP TSG RAN WG1 Meeting #93, R1-1807035, May 21-25, 2018, 19 pages.

Qualcomm Incorporated, "Study on NR-Based Access to Unlicensed Spectrum", 3GPP TSG RAN Meeting #77, RP-172021, Sep. 11-14, 2017, 5 pages.

* cited by examiner

FIG. 3

| SUBCARRIER SPACING SETTING μ | SUBCARRIER SPACING [kHz] | CYCLIC PREFIX | NUMBER OF SYMBOLS PER SLOT | NUMBER OF SLOTS PER RADIO FRAME | NUMBER OF SLOTS PER SUBFRAME |
|---|---|---|---|---|---|
| 0 | 15 | NORMAL CP | 14 | 10 | 1 |
| 1 | 30 | NORMAL CP | 14 | 20 | 2 |
| 2 | 60 | NORMAL CP | 14 | 40 | 4 |
| 2 | 60 | EXTENDED CP | 12 | 40 | 4 |
| 3 | 120 | NORMAL CP | 14 | 80 | 8 |
| 4 | 240 | NORMAL CP | 14 | 160 | 16 |

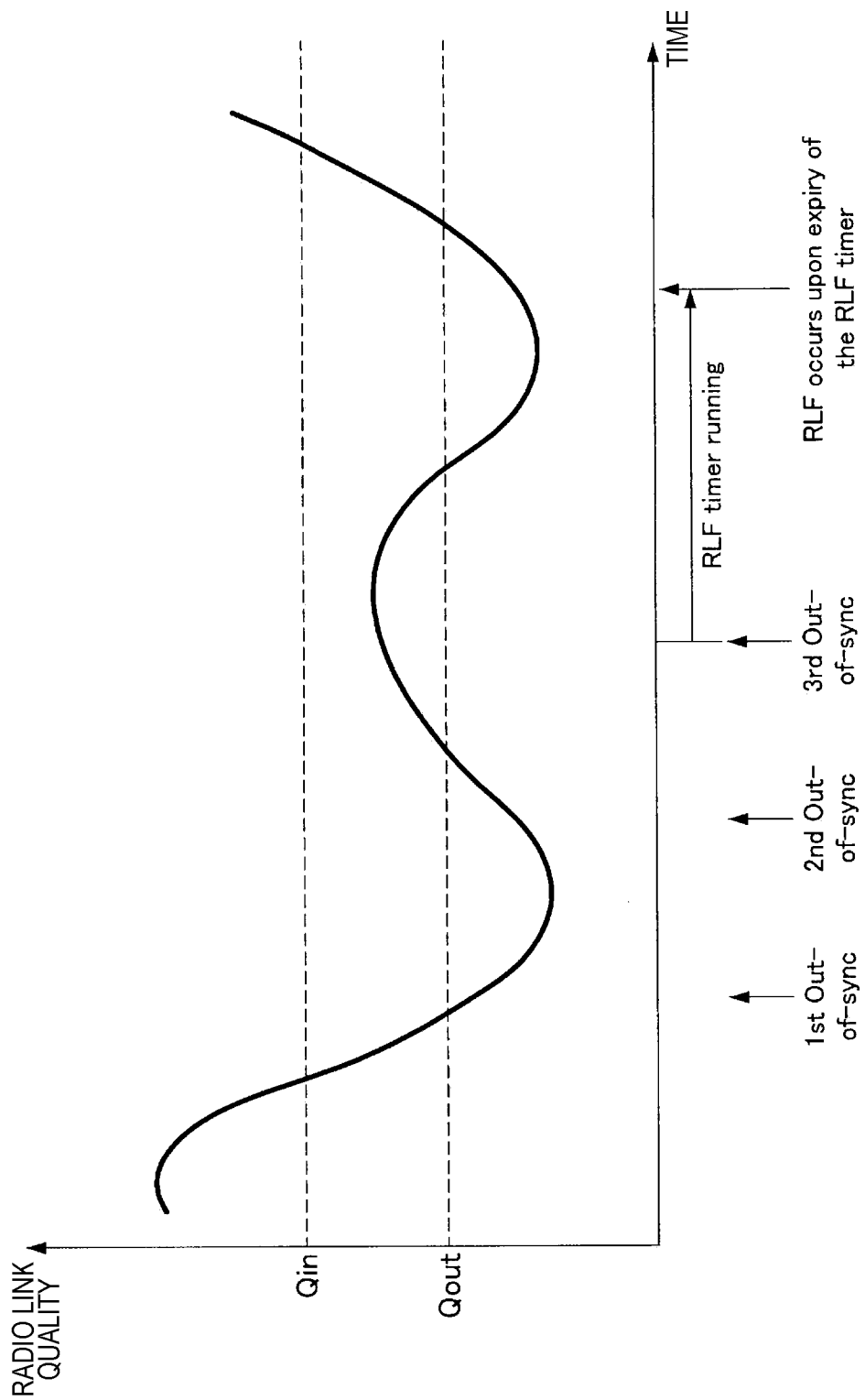

WIRELESS COMMUNICATION DEVICE, WIRELESS COMMUNICATION METHOD, AND COMPUTER PROGRAM

CROSS-REFERENCE TO RELATED APPLICATIONS

The present application is based on PCT filing PCT/JP2019/030131, filed Aug. 1, 2019, which claims priority to JP 2018-150340, filed Aug. 9, 2018, the entire contents of each are incorporated herein by reference.

TECHNICAL FIELD

The present disclosure relates to a wireless communication device, a wireless communication method, and a computer program.

BACKGROUND ART

Wireless access schemes and wireless networks of cellular mobile communication (hereinafter also referred to as Long Term Evolution (LTE), LTE-Advanced (LTE-A), LTE-Advanced Pro (LTE-A Pro), New Radio (NR), New Radio Access Technology (NRAT), 5G, Evolved Universal Terrestrial Radio Access (EUTRA), or Further EUTRA (FEUTRA)) are under review in 3rd Generation Partnership Project (3GPP). Further, in the following description, LTE includes LTE-A, LTE-A Pro, and EUTRA, and NR includes NRAT and FEUTRA. In LTE, a base station device (base station) is also referred to as an evolved Node B (eNodeB), in NR, the base station device (base station) is also referred to as gNodeB, and in LTE and NR, a terminal device (a mobile station, a mobile station device, or a terminal) is also referred to as a user equipment (UE). LTE and NR are cellular communication systems in which a plurality of areas covered by a base station device is arranged in a cell form. A single base station device may manage a plurality of cells.

NR is a different Radio Access Technology (RAT) from LTE as a wireless access scheme of the next generation of LTE. NR is an access technology capable of handling various use cases including Enhanced Mobile broadband (eMBB), Massive Machine Type Communications (mMTC), and Ultra Reliable and Low Latency Communications (URLLC). NR is reviewed for the purpose of a technology framework corresponding to use scenarios, request conditions, placement scenarios, and the like in such use cases.

The operation and management of wireless access schemes based on cellular communication in unlicensed bands and license shared bands is being considered. In such unlicensed bands, coexistence with other nodes and wireless systems is important, and function such as Listen Before Talk (LBT), which senses the channel before transmitting, and discontinuous transmission are demanded for wireless access schemes such as LTE and NR. Details about a wireless access scheme based on NR in unlicensed bands are disclosed in Non-Patent Document 1. Note that the unlicensed bands are the 2.4 GHz band, the 5 GHz band, and the 6 GHz band, for example. The license shared bands are the 3.5 GHz band and the 37 GHz band, for example.

Typically, in spectrum shared by different operators such as an unlicensed band or a license shared band, transmission is performed in accordance with a concept referred to as Listen Before Talk (LBT) to maintain fairness in providing transmission opportunities. An operator refers to a telecommunications carrier having a network for mobile communication and providing mobile communication services. According to LBT, a transmission device performs carrier sensing before transmission to check whether the channel is idle, and transmits after obtaining channel access rights. From the perspective of channel fairness, in many cases the transmission device secures the channel when data to be transmitted is generated, and releases the channel when transmission ends after a fixed period.

CITATION LIST

Non-Patent Document

Non-Patent Document 1: RP-172021, "Study on NR-based Access to Unlicensed Spectrum," 3GPP TSG RAN Meeting #77, Sapporo, Japan, Sep. 11-14, 2017.

SUMMARY OF THE INVENTION

Problems to be Solved by the Invention

In cellular operation in an unlicensed band in related art, a communication device can detect a downlink using a cell specific reference signal (CRS). However, radio access which does not use the CRS is desired in terms of increase in power consumption, an overhead, and the like.

The present disclosure therefore proposes a new and improved wireless communication device, wireless communication method and computer program which enables reliable detection of a downlink without using a CRS.

Solutions to Problems

According to the present disclosure, there is provided a wireless communication device including a communication unit configured to perform wireless communication using an unlicensed band; and a detecting unit configured to detect a downlink on the basis of a second downlink signal different from a first downlink signal which is periodically transmitted, in which the detecting unit starts PDCCH monitoring after detecting a downlink.

Further, according to the present disclosure, there is provided a wireless communication device including a communication unit configured to perform wireless communication using an unlicensed band; and a communication control unit configured to cause a second downlink signal different from a first downlink signal which is periodically transmitted, to be transmitted from the communication unit, in which PDCCH monitoring is caused to be performed after a downlink is detected on the basis of the second downlink signal.

Further, according to the present disclosure, there is provided a wireless communication method including performing wireless communication using an unlicensed band, detecting a downlink on the basis of a second downlink signal different from a first downlink signal which is periodically transmitted, and starting PDCCH monitoring after detecting a downlink.

Further, according to the present disclosure, there is provided a wireless communication method including performing wireless communication using an unlicensed band, causing a second downlink signal different from a first downlink signal which is periodically transmitted, to be transmitted, and causing PDCCH monitoring to be performed after a downlink is detected on the basis of the second downlink signal.

Further, according to the present disclosure, there is provided a computer program for causing a computer to execute a process including performing wireless communication using an unlicensed band, detecting a downlink on the basis of a second downlink signal different from a first downlink signal which is periodically transmitted, and starting PDCCH monitoring after detecting a downlink.

Further, according to the present disclosure, there is provided a computer program for causing a computer to execute a process including performing wireless communication using an unlicensed band, causing a second downlink signal different from a first downlink signal which is periodically transmitted, to be transmitted, and causing PDCCH monitoring to be performed after a downlink is detected on the basis of the second downlink signal.

Effects of the Invention

As described above, according to the present disclosure, it is possible to provide a new and improved wireless communication device, wireless communication method and computer program which enables reliable detection of a downlink without using a CRS.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3 is a table for explaining a subcarrier spacing setting.

FIG. 7 is a view illustrating an example of fluctuation of radio link quality over time and in-sync/out-of-sync.

MODE FOR CARRYING OUT THE INVENTION

Figure 1:
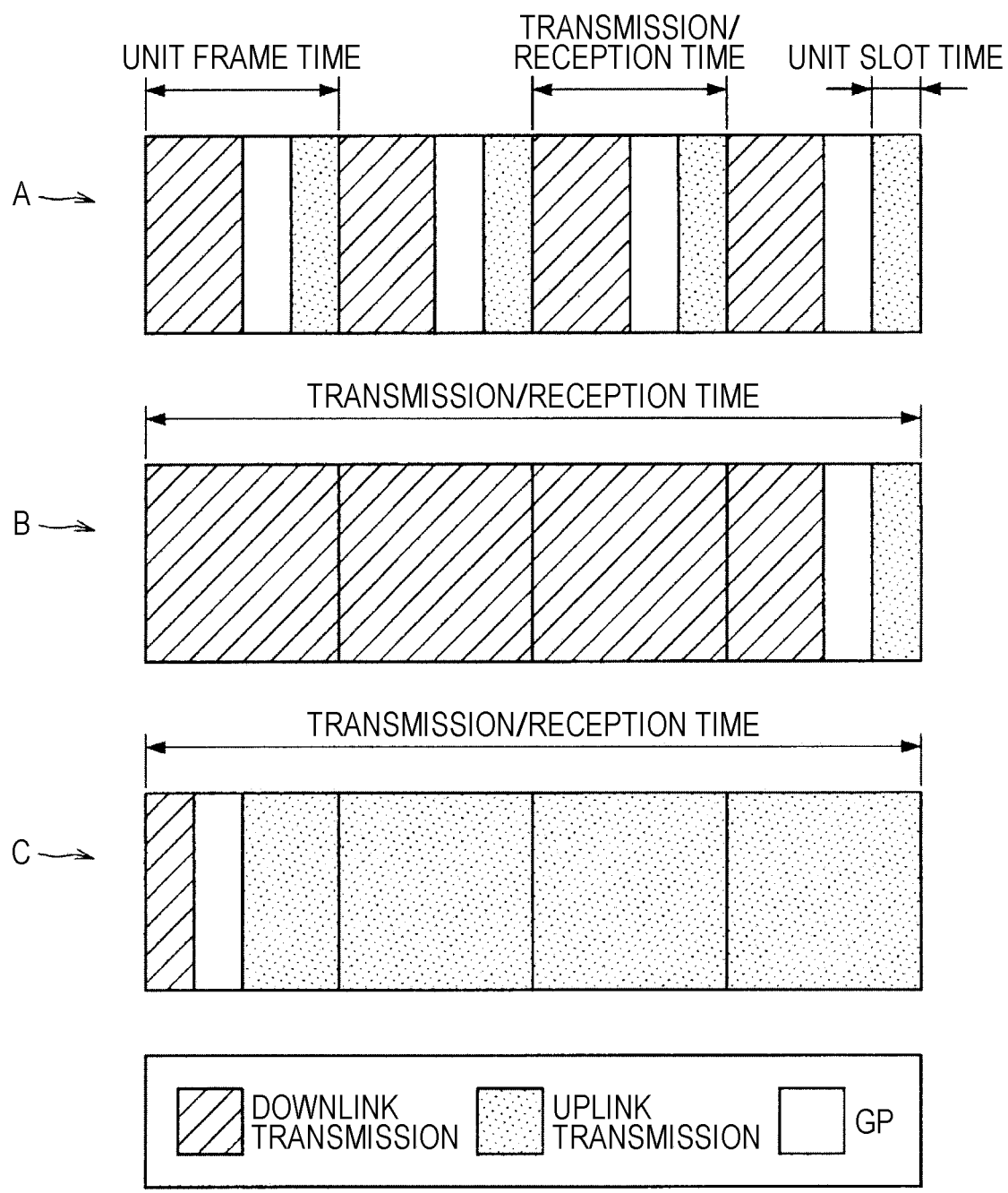
FIG. 1 is an explanatory diagram illustrating examples (A to C) of self-contained transmission frame configurations according to the embodiment.

Hereinafter, (a) preferred embodiment(s) of the present disclosure will be described in detail with reference to the appended drawings. Note that, in this specification and the appended drawings, constituent elements that have substantially the same function and configuration are denoted with the same reference numerals, and repeated explanation of these constituent elements is omitted.

Note that description will be provided in the following order.

1. Embodiment of present disclosure
   1.1. Related technology
   1.2. Circumstances
   1.3. Configuration examples
   1.4. Operation examples
   1.5 Others
2. Application examples
3. Conclusion <1. Embodiment of Present Disclosure>

[1.1 Related Technology]

First, technology related to the proposed technique will be described.

<NR Frame Configuration in the Present Embodiment>

In NR, physical channels and/or physical signals can be transmitted by self-contained transmission. FIG. 1 is a diagram showing an example of a frame configuration of self-contained transmission in the present embodiment (A to C). In self-contained transmission, a single transmission/reception includes continuous downlink transmission, GP, and continuous downlink transmission in order from the top.

The continuous downlink transmission includes at least a single piece of downlink control information and DMRS. The downlink control information provides an instruction to receive a downlink physical channel included in the continuous downlink transmission or an instruction to transmit an uplink physical channel included in the continuous uplink transmission. In a case where the instruction to receive the downlink physical channel has been provided by the downlink control information, a terminal device 200 attempts to receive the downlink physical channel on the basis of the downlink control information. Then, the terminal device 200 transmits a result as to whether or not the downlink physical channel has been successfully received (successfully decoded), through an uplink control channel included in the uplink transmission allocated after the GP. Meanwhile, in a case where the instruction to transmit the uplink physical channel has been provided by the downlink control information, the uplink physical channel to be transmitted on the basis of the downlink control information is included in uplink transmission, and then transmitted. As described above, it is possible to immediately cope with an increase or decrease in uplink and downlink traffic rates by flexibly switching between uplink data transmission and downlink data transmission according to the downlink control information. Furthermore, it is possible to achieve low-delay downlink communication by providing notification of success or failure in downlink reception through uplink transmission immediately following the downlink reception.

A unit slot time is the smallest time unit defining downlink transmission, GP, or uplink transmission. The unit slot time is reserved for any of downlink transmission, GP, and uplink transmission. The unit slot time does not include both downlink transmission and uplink transmission. The unit slot time may be the minimum transmission time for a channel associated with DMRS included in the unit slot time. One unit slot time is defined by, for example, an NR sampling interval ($T_s$) or an integral multiple of a symbol length.

A unit frame time may be the minimum time specified in scheduling. The unit frame time may be the smallest unit in which a transport block is transmitted. The unit slot time may be the maximum transmission time for the channel associated with the DMRS included in the unit slot time. The unit frame time may be a unit time for uplink transmission power to be determined in the terminal device 200. The unit frame time may be referred to as a subframe. There are three types of unit frame time as follows: downlink transmission only, uplink transmission only, and a combination of uplink transmission and downlink transmission. One unit frame time is defined by, for example, the NR sampling interval ($T_s$), the symbol length, or an integral multiple of the unit slot time.

A transmission/reception time is a time required for a single transmission/reception. An interval between a single transmission/reception and another transmission/reception is occupied by a time (gap) in which none of physical channels and physical signals is transmitted. The terminal device 200 does not need to average CSI measurements concerning different transmissions/receptions. The transmission/reception time may be referred to as TTI. One transmission/reception time is defined by, for example, the NR sampling interval ($T_s$), the symbol length, the unit slot time, or an integral multiple of the unit frame time.

Figure 2:
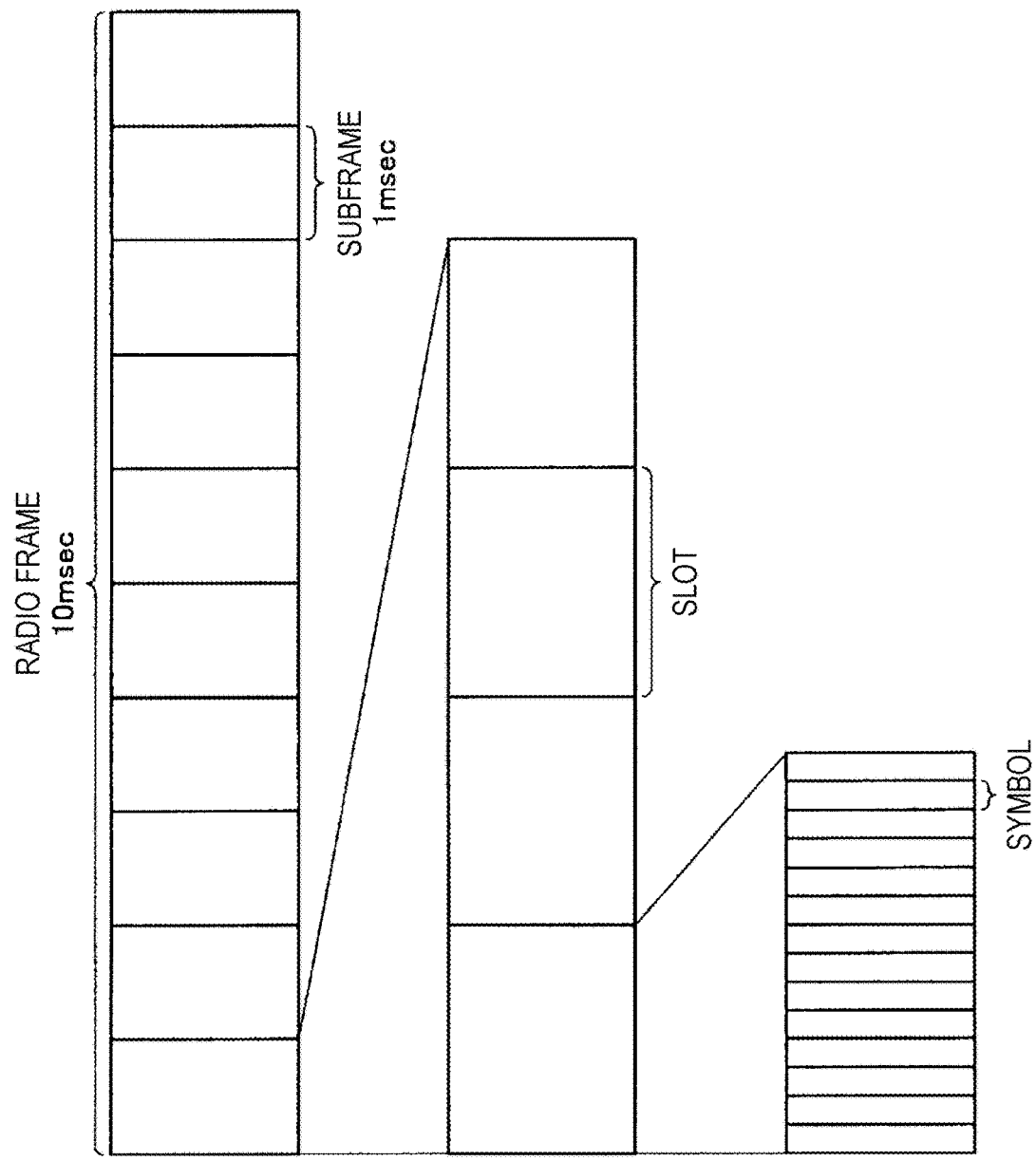
FIG. 2 is an explanatory diagram illustrating a frame configuration.

In the embodiment, a 10 millisecond (ms) radio frame is prescribed. Each radio frame contains two half frames. The time interval of each half frame is 5 ms. Each half frame contains five subframes. The time interval of each subframe is 1 ms. Furthermore, a single subframe contains one or more slots. The time interval of a slot depends on the numerology (OFDM numerology). The numerology is prescribed by the combination of the subcarrier spacing (SCS) and the cyclic prefix (CP). In the embodiment, the supported subcarrier spacings are prescribed by multiplying a standard of 15 kilohertz (kHz) by powers of 2. Specifically, 15 kHz, 30 kHz, 60 kHz, 120 kHz, and 240 kHz are supported as subcarrier spacings. The time interval of a slot is 1 ms for the 15 kHz subcarrier spacing, 0.5 ms for the 30 kHz subcarrier spacing, 0.25 ms for the 60 kHz subcarrier spacing, 0.125 ms for the 120 kHz subcarrier spacing, and 0.0625 ms for the 240 kHz subcarrier spacing. A single slot contains 14 symbols in the case of a normal CP, and 12 symbols in the case of an extended CP. FIG. 2 is an explanatory diagram illustrating a frame configuration. FIG. 3 is a table for explaining a subcarrier spacing setting.

<Resource Grid>

In the present embodiment, a physical signal or a physical channel to be transmitted in each numerology and in each carrier is expressed with a resource grid. The resource grid is defined with a plurality of resource elements. One resource element at a predetermined antenna port is expressed with one sub-carrier and one symbol. An index of the resource element at the predetermined antenna port can be expressed with a combination of a sub-carrier index and a symbol index.

Figure 4:
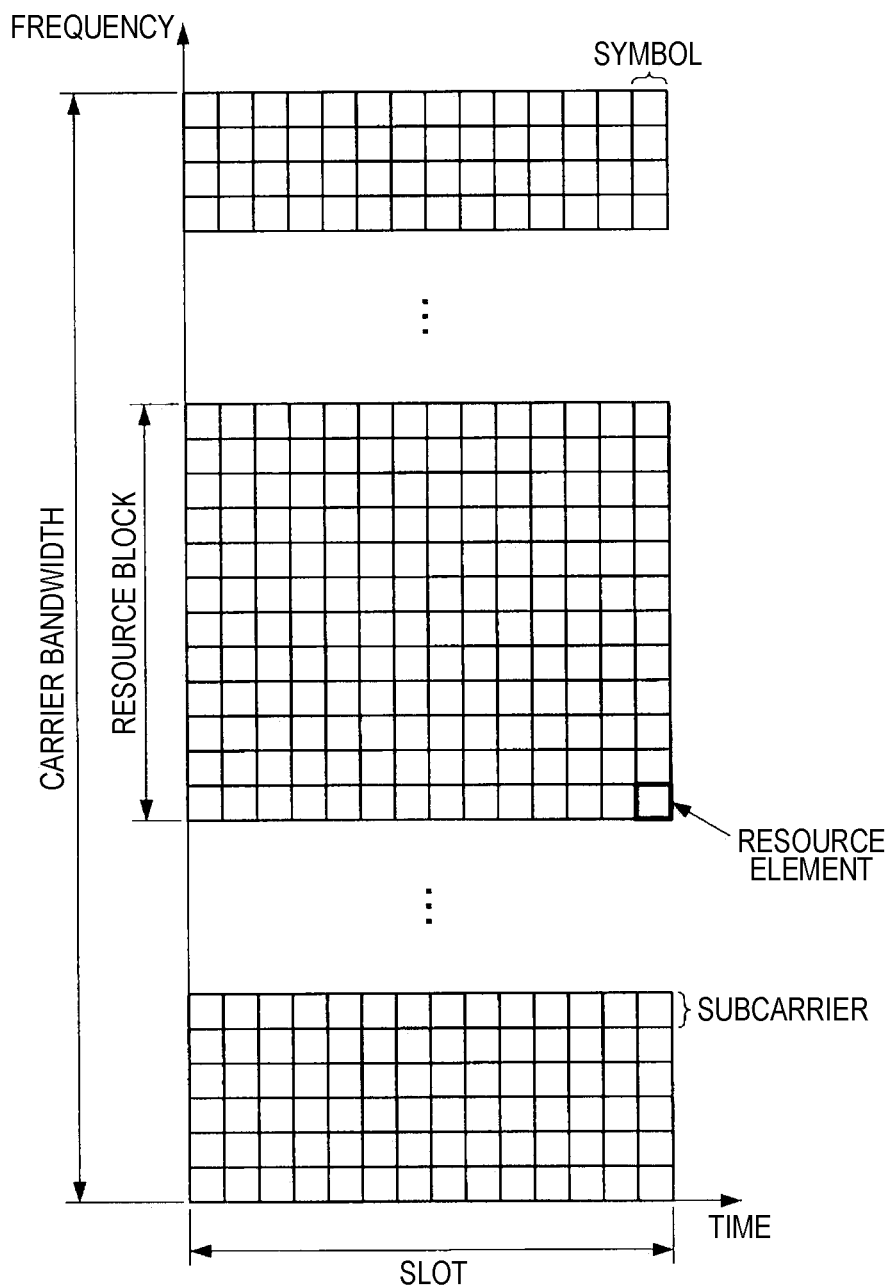
FIG. 4 is an explanatory diagram illustrating an example of a resource grid.

Further, in the present embodiment, a resource block which is unit on a frequency axis is defined. One resource block (RB, physical resource block: PRB) includes 12 sub-carriers which are continuous on a frequency axis. The resource block includes a common resource block (CRB), a physical resource block (PRB), and a virtual resource block (VRB). The common resource block is a resource block defined with a predetermined bandwidth and a predetermined numerology. The common resource block is started from a point A in all numerologies. A frequency designated at the point A becomes a center of a sub-carrier #0 of a common resource block #0 in all the numerologies. The physical resource block is a resource block defined within a predetermined bandwidth part, and a physical resource block index is numbered starting from 0 within the predetermined bandwidth part. The virtual resource block, which is a logical resource block, is used to perform mapping to a physical resource block from a pre-coded signal of the PDSCH or the PUSCH. FIG. 4 is an explanatory diagram illustrating an example of the resource grid.

Figure 5:
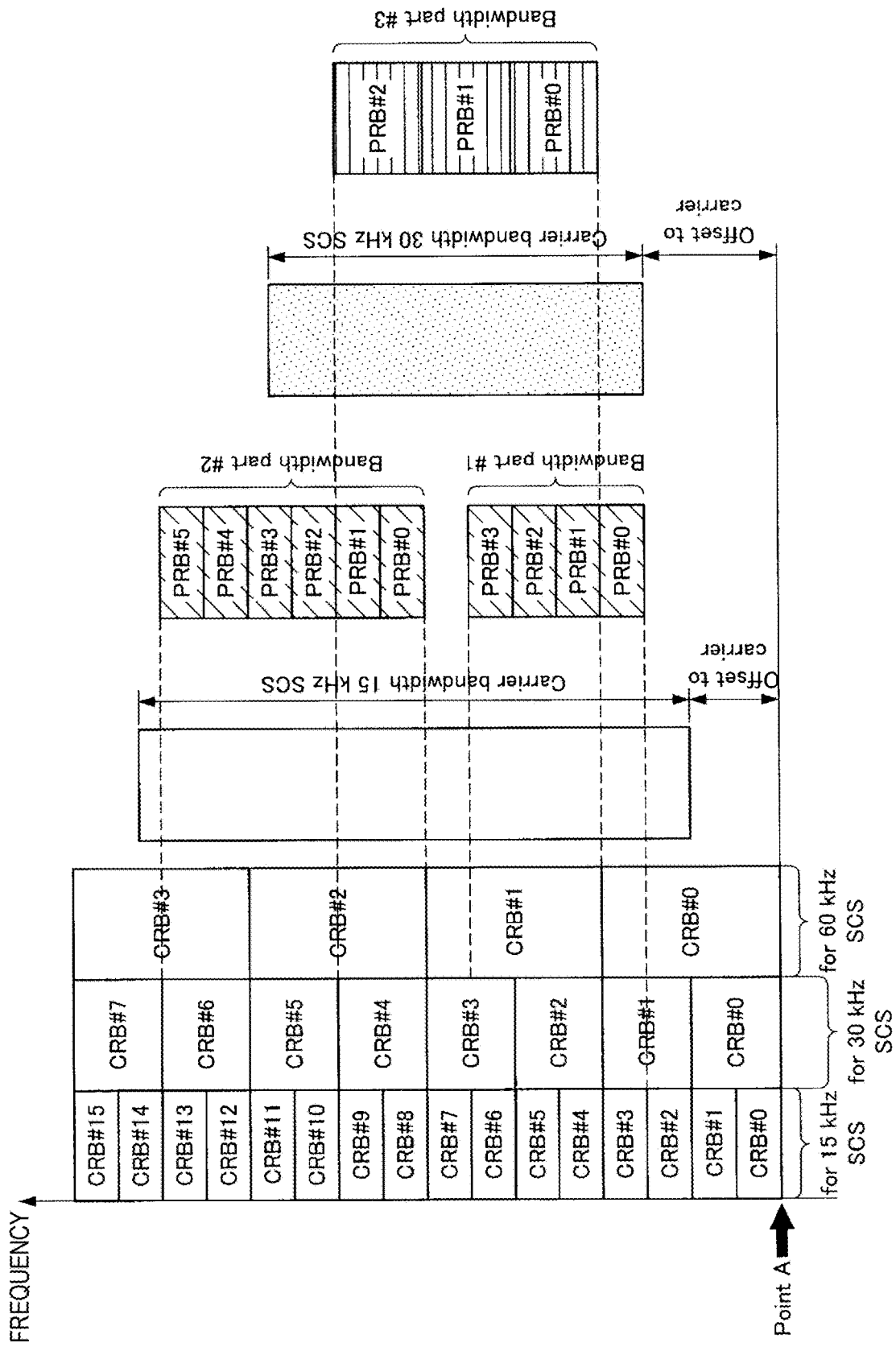
FIG. 5 is an explanatory diagram illustrating an example of a bandwidth part.

Further, in the present embodiment, it is possible to set a sub-set of continuous common resource blocks, which is called a bandwidth part (BWP). The bandwidth part using a predetermined numerology falls within a bandwidth of a carrier defined with the numerology. Up to four bandwidth parts are set for each terminal device. There is one active bandwidth part in a predetermined period. The terminal device does not expect reception of a PDSCH, a PDCCH and a CSI-RS outside a downlink active bandwidth part. The terminal device does not transmit a PUSCH and a PUCCH outside an uplink active bandwidth part. In a predetermined active cell, the terminal device does not transmit an SRS outside the uplink active bandwidth part. FIG. 5 is an explanatory diagram illustrating an example of the bandwidth part.

<Slot Format>

In a TDD cell (unpaired spectrum), a state of each of 14 symbols within the slot can be classified into a downlink (DL, D), an uplink (UL, U) or a flexible (F) state. The terminal device assumes from the downlink symbol that the channel can be utilized for reception. The terminal device assumes from the uplink symbol that the channel can be utilized for transmission. The terminal device assumes from the flexible symbol that the channel can be utilized for transmission or reception. Further, the flexible symbol may be utilized as a switching period for switching between a downlink and an uplink, or a guard period.

These states of the symbols are designated with TDD configuration information common to terminal devices (TDD-UL-DL-ConfigCommon), TDD configuration information dedicated for each terminal device (TDD-UL-DL-ConfigDedicaated), and/or a slot format index carried by the DCI.

The TDD configuration information common to terminal devices includes information regarding a downlink slot and the number of downlink symbols, an uplink slot and the number of uplink symbols, and a cycle for switching between an uplink and a downlink. The TDD configuration information common to terminal devices includes information regarding all downlinks (all DL), all uplinks (all UL) or the number of downlink symbols and uplink symbols, for each symbol. The slot format index, which is an index of a slot format representing a combination of states of 14 symbols, is designated in slot unit. A format indicating the slot format is also referred to as a slot format indicator (SFI).

Figure 6A:
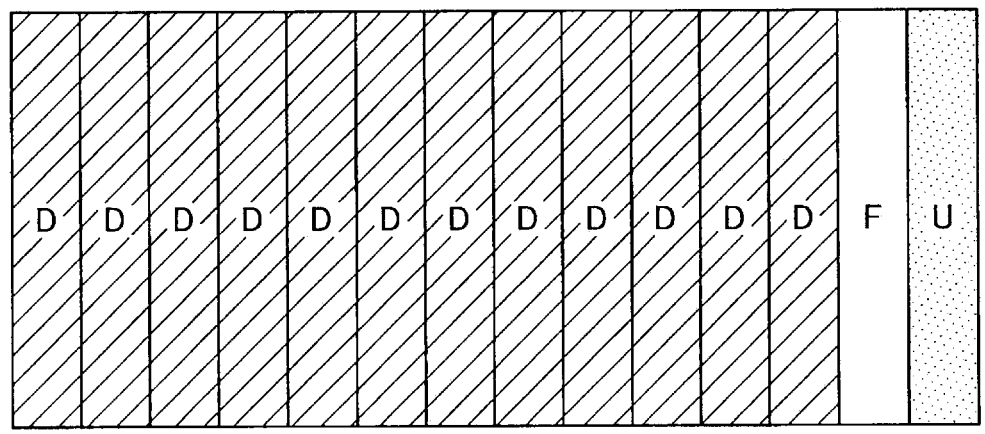
FIG. 6A is an explanatory diagram illustrating an example of a slot format.
Figure 6B:
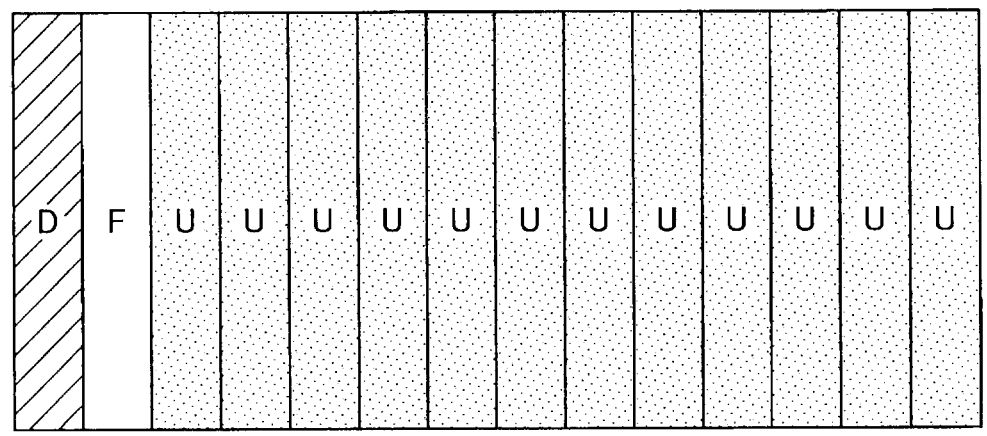
FIG. 6B is an explanatory diagram illustrating an example of a slot format.

The above-described TDD configuration or slot format enables flexible switching between an uplink and a downlink in symbol unit. FIG. 6A and FIG. 6B illustrate an example of the slot format. FIG. 6A illustrates an example where the first to the twelfth symbols are downlink symbols, the thirteenth symbol is a flexible symbol, and the fourteenth symbol is an uplink symbol. The SFI of this slot indicates "DDDDDDDDDDDDFU" sequentially from the head symbol of the slot. This enables transmission and reception of the HARQ-ACK corresponding to the PDSCH in the same slot. FIG. 6B illustrates an example where the first symbol is a downlink symbol, the second symbol is a flexible symbol, and the third to the fourteenth symbols are uplink symbols. The SFI of this slot indicates "DFUUUUUUUUUUUU" sequentially from the symbol of the slot. This enables transmission and reception of the PUSCH corresponding to the UL grant in the same slot.

<Channel Access Procedure of Unlicensed Channel>

The channel access (Listen Before Talk) procedure is performed by the base station device or the terminal device to access an unlicensed channel for transmission.

Channel sensing is performed once or multiple times in the channel access procedure. Determination (vacancy determination) as to whether a channel is idle (unoccupied, available, or enable) or busy (occupied, unavailable, or disable) is made on the basis of a result of the sensing. The power of the channel in a predetermined latency is sensed in the channel sensing.

Examples of the latency in the channel access procedure include a first latency (slot), a second latency, and a third latency (defer period), a fourth latency.

A slot is the unit of latency of a base station device and a terminal device in the channel access procedure. The slot is defined as, for example, 9 microseconds.

A single slot is inserted at the beginning of the second latency. The second latency is defined as, for example, 16 microseconds.

A defer period includes the second latency and a plurality of consecutive slots following the second latency. The number of the plurality of consecutive slots following the second latency is determined on the basis of a priority class (channel access priority class) to be used to satisfy QoS.

The fourth latency includes the second latency and a single slot following the second latency.

The base station device or the terminal device senses a predetermined channel during a period of a predetermined slot. The predetermined slot is considered idle in a case where the base station device or the terminal device detects power smaller than a predetermined power detection threshold for at least 4 microseconds in the period of the predetermined slot. Meanwhile, in a case where the detected power is larger than the predetermined power detection threshold, the predetermined slot is considered busy.

The channel access procedures include a first channel access procedure and a second channel access procedure. The first channel access procedure is performed by use of a plurality of slots and the defer period. Furthermore, the second channel access procedure is performed by use of the single fourth latency.

Parameters related to channel access are determined on the basis of the priority class. Examples of the parameters related to channel access include a minimum contention window, a maximum contention window, a maximum channel exclusivity time, and values that the contention window may take. The priority class is determined by a QoS class identifier (QCI) that processes quality of service (QoS). A correspondence table between the priority class and parameters related to channel access is illustrated in Table 1, and an example of a mapping between the priority class and the QCI is illustrated in Table 2.

[Table 1]

TABLE 1

Example of correspondence relationships between priority class and parameters related to channel access

| Channel access priority class (p) | $m_p$ | Minimum contention window $CW_{min,p}$ | Maximum contention window $CW_{max,p}$ | Maximum channel exclusivity time $T_{mcot,p}$ | Values that contention window $CW_p$ may take |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

[Table 2]

TABLE 2

Example of mapping between priority class and QCI

| Channel access priority class (p) | QCI |
|---|---|
| 1 | 1, 3, 5, 65, 66, 69, 70 |
| 2 | 2, 7 |
| 3 | 4, 6, 8, 9 |
| 4 | Other than above |

<Details of First Channel Access Procedure>

Procedures set forth below are performed in the first channel access procedure.

(0) Channel sensing is performed in the defer period. In a case where the channel is idle in a slot within the defer period, the process proceeds to step (1). Otherwise, the process proceeds to step (6).

(1) A counter initial value is acquired. Possible values of the counter initial value are integers between 0 and a contention window CW. Furthermore, the counter initial value is randomly determined in accordance with a uniform distribution. Then, the initial value of a counter N is set to the acquired counter initial value, and the process proceeds to step (2).

(2) In a case where a value of the counter N is larger than 0 and decrement of the counter N has been selected, the counter N is decremented by 1. Thereafter, the process proceeds to step (3).

(3) The process shifts to a standby state after a slot period is added. Furthermore, the channel is sensed in the additional slot. In a case where the additional slot is idle, the process proceeds to step (4). Otherwise, the process proceeds to step (5).

(4) In a case where the counter N indicates 0, this procedure is stopped. Otherwise, the process proceeds to step (2).

(5) The process shifts to a standby state after a defer period is added. Furthermore, the channel is sensed until it is detected that any one of slots included in the added defer period is busy, or until it is detected that all the slots included in the added defer period are idle. Thereafter, the process proceeds to step (6).

(6) In a case where it is sensed that the channel is idle in all the slots included in the added defer period, the process proceeds to step (4). Otherwise, the process proceeds to step (5).

After step (4) is stopped in the above procedure, transmission including data is performed on the channel by use of PDSCH, PUSCH, or the like.

Note that transmission need not be performed on the channel after step (4) is stopped in the above procedure. In this case, it is possible to then perform transmission without performing the above procedure, in a case where the channel is idle in all of the slots and the defer periods immediately before transmission. Meanwhile, in a case where the channel is not idle in any of the slots and the defer periods, the process proceeds to step (1) of the above procedure after it is sensed that the channel is idle in all the slots in the added defer period.

<Details of Second Channel Access Procedure>

In the second channel access procedure, transmission may be performed immediately after the channel is considered idle as a result of sensing in at least the fourth latency. Meanwhile, in a case where the channel is not considered idle as a result of the sensing in at least the fourth latency, no transmission is performed.

<Contention Window Adaptive Procedure>

A contention window CW to be used in the first channel access procedure is determined on the basis of the contention window adaptive procedure.

The value of the contention window CW is held for each priority class. Furthermore, the contention window CW takes a value between a minimum contention window and a maximum contention window. The minimum contention window and the maximum contention window are determined on the basis of the priority class.

Adjustment of the value of the contention window CW is performed prior to step (1) in the first channel access procedure. The value of the contention window CW is increased in a case where the rate of NACKs is higher than a threshold in at least a HARQ response corresponding to a reference subframe in the contention window adaptive procedure or a shared channel in a reference HARQ process. Otherwise, the value of the contention window CW is set to the minimum contention window.

The value of the contention window CW is increased on the basis of, for example, the following equation: $CW=2 \cdot (CW+1)-1$.

<Details of Radio Link Monitoring (RLM) in the Present Embodiment>

The radio link monitoring (RLM) is used to maintain reliability of establishment of connection between a base station device (EUTRA) and a terminal device (UE) in an RRC layer. The RLM allows the terminal device to determine whether or not connection of a downlink is maintained.

The terminal device detects quality of connection (link) with the connecting base station device (cell, serving cell) and monitors downlink quality of a primary cell to indicate whether the state is an in-sync state or an out-of-sync state, to an upper layer. Further, in a case where dual connectivity (SCG) is set, and a parameter regarding a radio link failure (RLF) is provided from the upper layer, the terminal device monitors downlink quality of a primary secondary cell. Hereinafter, monitoring of the downlink quality will be also referred to as RLM measurement.

The downlink quality (downlink radio link quality, downlink link quality) is monitored on the basis of the CRS. For example, the downlink quality is defined by received power of the CRS at the serving cell.

Whether the radio link quality indicates in-sync or out-of-sync is evaluated by comparing the downlink radio link quality with a threshold. In the threshold, a threshold $Q_{in}$ to be used for determining in-sync and a threshold $Q_{out}$ to be used for determining out-of-sync are defined.

FIG. 7 is a view illustrating an example of fluctuation of radio link quality over time and in-sync/out-of-sync. FIG. 7 illustrates an example where a state transitions from an in-sync state to an out-of-sync state. In a case where the radio link quality degrades below the threshold $Q_{out}$, a physical layer of the terminal device reports out-of-sync to the upper layer. In a case where the radio link quality does not exceed the threshold $Q_{in}$ even at the next evaluation timing, the physical layer of the terminal device reports out-of-sync to the upper layer. In a case where out-of-sync is continuously reported a predetermined number of times (N310, N313) set by a parameter relating to an RLF, the upper layer determines that there is a problem in the physical layer, and an RLF timer (T310, T313) runs. In a case where in-sync is continuously reported a predetermined number of times (N311, N314) set by a parameter relating to the RLF before this RLF timer overruns, the upper layer determines that the problem in the physical layer is solved, and the RLF timer (T310, T313) is stopped. Meanwhile, in a case where the RLF timer overruns, a radio link failure (RLF) occurs, and the terminal device exits from an RRC connection (RRC_CONNECTED) mode or reestablishes a connection. Further, in a case where the RLF timer (T310) of the primary cell overruns, transmission power of the terminal device is turned off within 40 milliseconds. Still further, in a case where the RLF timer (T313) of the primary secondary cell overruns, transmission power of the primary secondary cell is turned off within 40 milliseconds.

The threshold $Q_{out}$ is, for example, defined at a level equivalent to 10% of a block error rate of virtual PDCCH transmission in view of a PCFICH error. Further, the threshold $Q_{in}$ is, for example, defined at a level at which received quality is sufficiently favorable compared to the threshold $Q_{out}$ and which is equivalent to 2% of a block error rate of virtual PDCCH transmission in view of a PCFICH error.

The terminal device measures radio link quality of all radio frames in a predetermined time interval. Alternatively, in a case where a discontinuous reception (DRX) mode is set, the terminal device measures radio link quality of all the DRX sections in the predetermined time interval.

As the predetermined time interval for evaluating the radio link quality at the terminal device, a time interval $T_{Evaluate\_Q_{in}}$ for evaluating in-sync and a time interval $T_{Evaluate\_Q_{out}}$ for evaluating out-of-sync are individually defined.

The time interval $T_{Evaluate\_Q_{out}}$ is a minimum measurement interval defined for evaluating out-of-sync, and, for example, 200 milliseconds, and a length of a DRX cycle. Note that the above-described example indicates a minimum interval, and the terminal device may measure radio link quality during an interval longer than the above-described example.

The time interval $T_{Evaluate\_Q_{in}}$ is a minimum measurement interval defined for evaluating in-sync, and, for example, 100 milliseconds, and a length of a DRX cycle. Note that the above-described example indicates a minimum interval, and the terminal device may measure radio link quality during an interval longer than the above-described example.

Reports of in-sync and out-of-sync are spaced at least 10 milliseconds (one radio frame).

<Details of Channel Access Procedure in Downlink>

In a case of performing downlink transmission including PDSCH, PDCCH, and/or EPDCCH in an unlicensed channel, a base station device accesses the channel to perform the downlink transmission on the basis of the first channel access procedure.

Meanwhile, in a case of performing downlink transmission not including PDSCH but including DRS in an unlicensed channel, the base station device accesses the channel to perform the downlink transmission on the basis of the second channel access procedure. Note that it is preferable that the duration of the downlink transmission be smaller than 1 millisecond.

<Details of Channel Access Procedure in Uplink>

In a case where there is an instruction to perform the first channel access procedure in an uplink grant for scheduling PUSCH in an unlicensed channel, a terminal device performs the first channel access procedure prior to uplink transmission including the PUSCH.

Further, in a case where there is an instruction to perform the second channel access procedure in an uplink grant for scheduling PUSCH, a terminal device performs the second channel access procedure prior to uplink transmission including the PUSCH.

In addition, the terminal device performs the second channel access procedure for uplink transmission not including PUSCH but including SRS, prior to the uplink transmission.

Furthermore, in a case where the end of uplink transmission specified in the uplink grant is within uplink duration (UL duration), the terminal device performs the second channel access procedure prior to the uplink transmission, regardless of the type of procedure specified in the uplink grant.

Moreover, in a case where uplink transmission is performed after the fourth latency following the completion of downlink transmission from the base station, the terminal device performs the second channel access procedure prior to the uplink transmission.

<NR Channel Access Procedure According to Embodiment>

In the channel access procedure for an unlicensed channel using NR, channel sensing without beamforming and channel sensing with beamforming are performed.

Channel sensing without beamforming is channel sensing by receiving without controlling the directivity, or channel sensing that lacks direction information. Channel sensing that lacks direction information refers to channel sensing in which the measurement results from all directions are averaged, for example. The transmitting station does not have to be aware of the directivity (angle, direction) used by the channel sensing.

Channel sensing with beamforming is channel sensing by receiving while controlling the directivity, or channel sensing that has direction information. In other words, channel sensing with beamforming is channel sensing in which the reception beam is pointed in a predetermined direction. A transmitting station having the function of performing channel sensing with beamforming can perform channel sensing one or more times using different directivity.

By performing channel sensing with beamforming, the area to be detected by sensing is narrowed. With this arrangement, the transmitting station can decrease the frequency of detecting non-interfering communication links and reduce the exposed node problem.

[1.2 Circumstances]

In an NR unlicensed band (NR-U), a variety of use cases are expected to be supported, including not only Licensed Assisted Access (LAA) using the mechanism of carrier aggregation, but also dual connectivity, standalone operation in unlicensed bands only, and cases where one of either the DL carrier or the UL carrier is in a licensed band while the other is in an unlicensed band (for example, licensed DL and unlicensed UL).

To support these use cases, in an NR-U, the ability to transmit physical channels and physical signals transmitted by a primary cell (PCell), a secondary primary cell (PSCell), or a special cell (SpCell), such as the synchronization signal (SS), the PRACH, and PUCCH, in unlicensed bands is necessary.

The communication device performs operation such as automatic gain control (AGC), tracking, RRM/RLM/CSI (signal and interference) measurement and PDCCH monitoring by detecting continuous downlink channels/signals (DL burst). In LAA, the communication device detects a downlink using a cell specific reference signal (CRS). Meanwhile, in NR, LTEenhancement (new carrier type), or the like, in which an always-on signal like a CRS is not transmitted, it is necessary to detect a downlink using another mechanism.

The present discloser has therefore intensively studied a mechanism which enables the terminal device to reliably detect a downlink without using a CRS. As a result of the intensive study, the present discloser has achieved a mechanism which enables the terminal device to reliably detect a downlink without using a CRS as will be described below.

[1.3. Configuration Examples]

Figure 8:
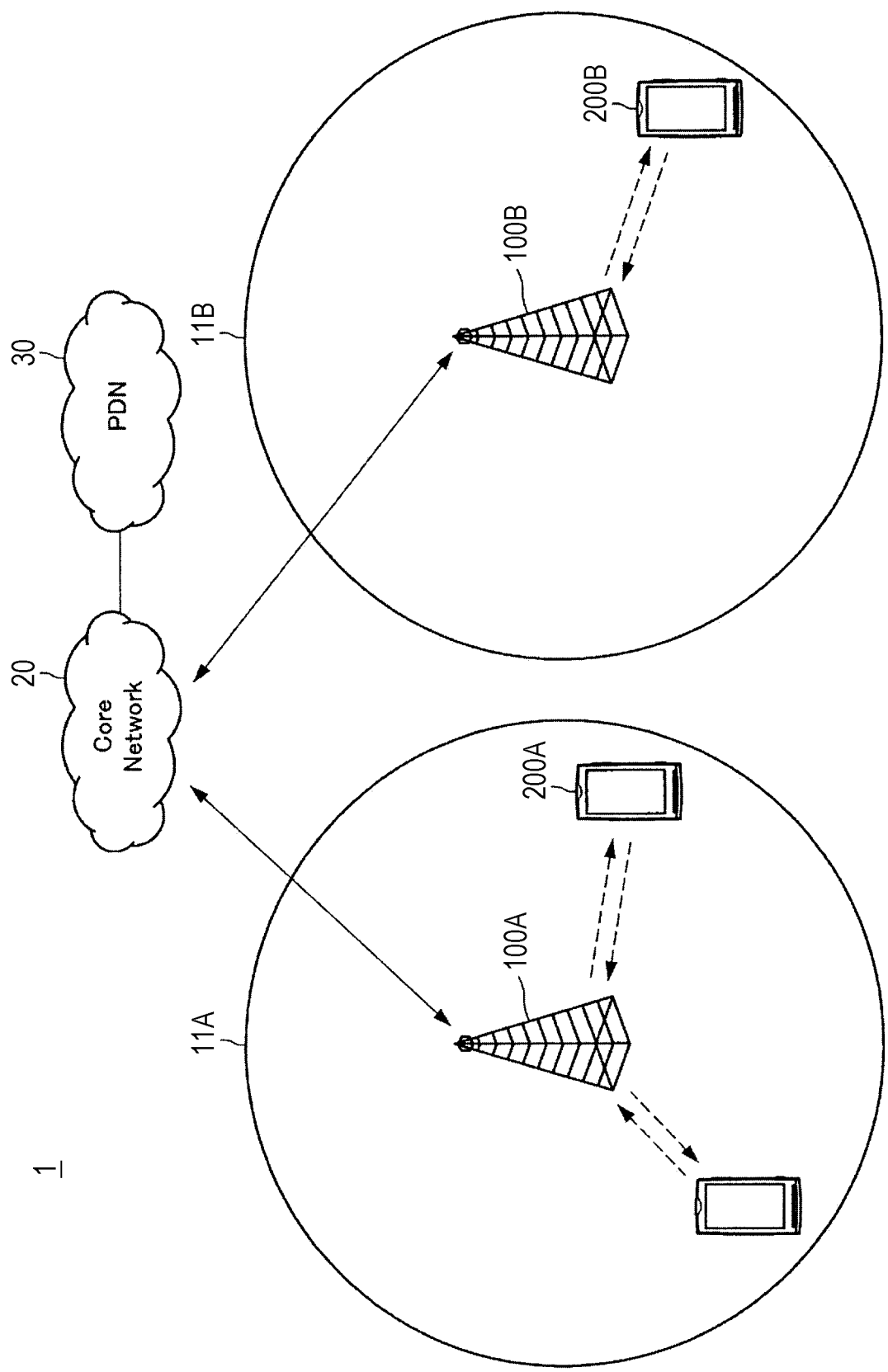
FIG. 8 is a diagram illustrating an example of an overall configuration of a system according to an embodiment of the present disclosure.

FIG. 8 is a diagram illustrating an example of an overall configuration of a system 1 according to an embodiment of the present disclosure. As illustrated in FIG. 8, the system 1 includes base station devices 100 (100A and 100B), terminal devices 200 (200A and 200B), a core network 20, and a packet data network (PDN) 30.

The base stations devices 100 operate cells 11 (11A or 11B), and provide wireless service to one or more terminal devices positioned inside the cells 11. For example, the base station device 100A provides wireless service to the terminal device 200A, and the base station device 100B provides wireless service to the terminal device 200B. The cells 11 may be operated in accordance with any wireless communication method, such as LTE or New Radio (NR) for example. The base station devices 100 are connected to the core network 20. The core network 20 is connected to the PDN 30.

The core network 20 may include a Mobility Management Entity (MME), a Serving Gateway (S-GW), a PDN Gateway (P-GW), a Policy and Charging Rules Function (PCRF), and a Home Subscriber Server (HSS). Alternatively, the core network 20 may include an NR entity having functions similar to the above. The MME is a control node that handles signals in the control plane, and manages the mobility state of terminal devices. The S-GW is a control node that handles signals in the user plane, and is a gateway device that switches the forwarding path for user data. The P-GW is a control node that handles signals in the user plane, and is a gateway device that acts a connecting point between the core network 20 and the PDN 30. The PCRF is a control node that controls behavior related to policies such as quality of service (QoS) for bearers, and also charging. The HSS is a control node that handles subscriber data and service control.

The terminal devices 200 wirelessly communicate with the base station devices 100 on the basis of control by the base station devices 100. The terminal devices 200 may be what is referred as user equipment (UE), but may also be relay nodes that relay transmissions to other terminal devices. For example, the terminal devices 200 transmit uplink signals to the base station devices 100 and receive downlink signals from the base station devices 100.

In the present embodiment in particular, the base station devices 100A and 100B are managed by respectively different operators. For example, the base station device 100A is managed by an operator A while the base station device 100B is managed by an operator B. Additionally, the base station devices 100A and 100B share the use of radio resources that are shareable between the respectively managing operators to provide wireless communication services.

Next, configuration examples of the base station devices 100 and the terminal devices 200 according to an embodiment of the present disclosure will be described.

Figure 9:
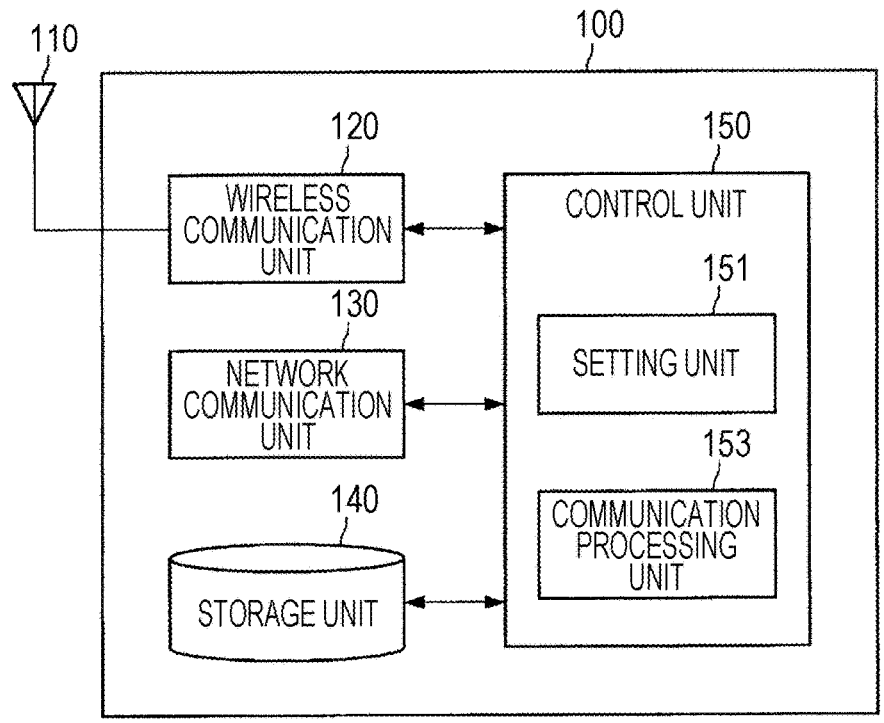
FIG. 9 is a block diagram illustrating an example of the configuration of a base station device according to the embodiment.

FIG. 9 is a block diagram illustrating an example of the configuration of a base station device 100 according to the embodiment. Referring to FIG. 9, the base station device 100 includes an antenna unit 110, a wireless communication unit 120, a network communication unit 130, a storage unit 140, and a control unit 150.

(1) Antenna Unit 110

The antenna unit 110 emits a signal output from the wireless communication unit 120, as radio waves in the air. Furthermore, the antenna unit 110 converts radio waves in the air into a signal, and outputs the signal to the wireless communication unit 120.

(2) Wireless Communication Unit 120

The wireless communication unit 120 transmits and receives signals. For example, the wireless communication unit 120 transmits a downlink signal to a terminal device, and receives an uplink signal from the terminal device.

(3) Network Communication Unit 130

The network communication unit 130 transmits and receives information. For example, the network communication unit 130 transmits information to other nodes, and receives information from other nodes. Examples of the other nodes described above include another base station and a core network node.

(4) Storage Unit 140

The storage unit 140 temporarily or permanently stores a program and various data for operation of the base station device 100.

(5) Control unit 150

The control unit 150 controls the operation of the base station device 100 as a whole to provide the various functions of the base station device 100. The control unit 150 includes, for example, a processor such as a central processing unit (CPU), various kinds of storage media such as a ROM, and the like. The control unit 150 includes a setting unit 151 and a communication processing unit 153.

The setting unit 151 has a function of setting settings related to communication with the terminal devices 200.

The communication processing unit 153 has a function of performing a process of communicating with the terminal devices 200.

The control unit 150 additionally may include other constituent elements besides the above constituent elements. In other words, the control unit 150 may also perform operations other than the operations of the above constituent elements.

Figure 10:
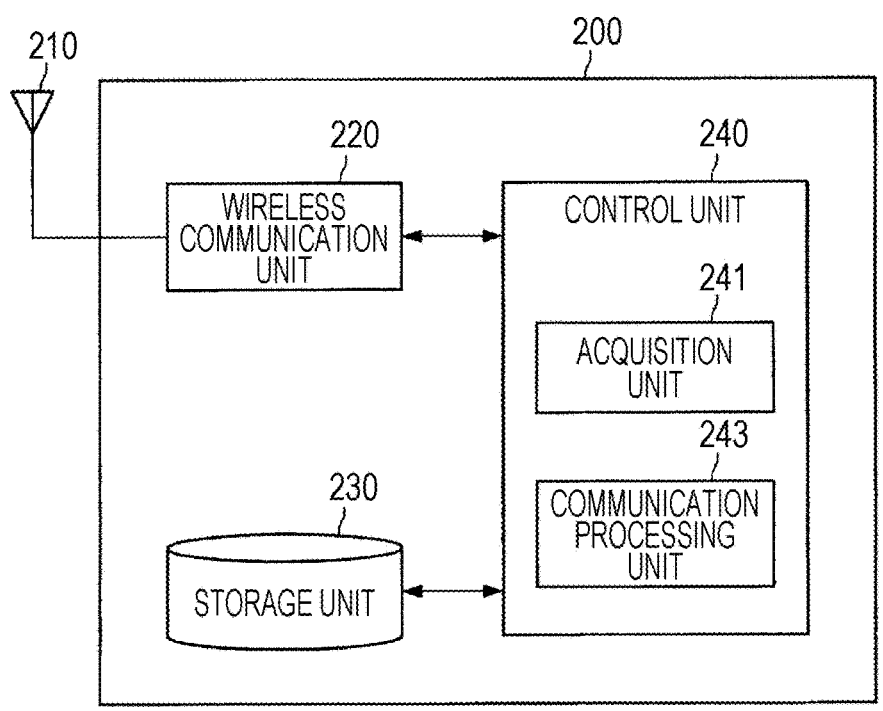
FIG. 10 is a block diagram illustrating an example of the configuration of a terminal device according to the embodiment.

FIG. 10 is a block diagram illustrating an example of the configuration of a terminal device 200 according to the embodiment. Referring to FIG. 10, the terminal device 200 includes an antenna unit 210, a wireless communication unit 220, a storage unit 230, and a control unit 240.

(1) Antenna Unit 210

The antenna unit 210 emits a signal output from the wireless communication unit 220, as radio waves in the air. Furthermore, the antenna unit 210 converts radio waves in the air into a signal, and outputs the signal to the wireless communication unit 220.

(2) Wireless Communication Unit 220

The wireless communication unit 220 transmits and receives signals. For example, the wireless communication unit 220 receives a downlink signal from a base station, and transmits an uplink signal to the base station.

(3) Storage Unit 230

The storage unit 230 temporarily or permanently stores a program and various data for operation of the terminal device 200.

(4) Control Unit 240

The control unit 240 controls the operation of the terminal device 200 as a whole to provide the various functions of the terminal device 200. The control unit 240 includes, for example, a processor such as a central processing unit (CPU), various kinds of storage media such as a ROM, and the like. The control unit 240 includes an information acquisition unit 241 and a communication processing unit 243.

The information acquisition unit 241 has a function of acquiring information from signals obtained from radio waves received by the antenna unit 210.

The communication processing unit 243 has a function of performing a process of communicating with the base station device 100.

The control unit 240 additionally may include other constituent elements besides the above constituent elements. In other words, the control unit 240 may also perform operations other than the operations of the above constituent elements.

Configuration examples of the base station devices 100 and the terminal devices 200 according to an embodiment of the present disclosure have been described above. Next, operations of the base station devices 100 and the terminal devices 200 according to an embodiment of the present disclosure will be described.

[1.4. Operation Examples]

A method in which the base station device 100 and the terminal device 200 detect a downlink without using a CRS will be described below. For example, the terminal device 200 detects a downlink on the basis of a downlink signal different from downlink signals which are periodically transmitted. The downlink signal different from the downlink signals which are periodically transmitted is, for example, acquired by the information acquisition unit 241. The information acquisition unit 241 can thus function as an example of a detecting unit of the present disclosure. A specific example of the method in which the terminal device 200 detects a downlink in a case where wireless communication is performed using an unlicensed band of NR will be described below.

(1) PDCCH Monitoring

Figure 11:
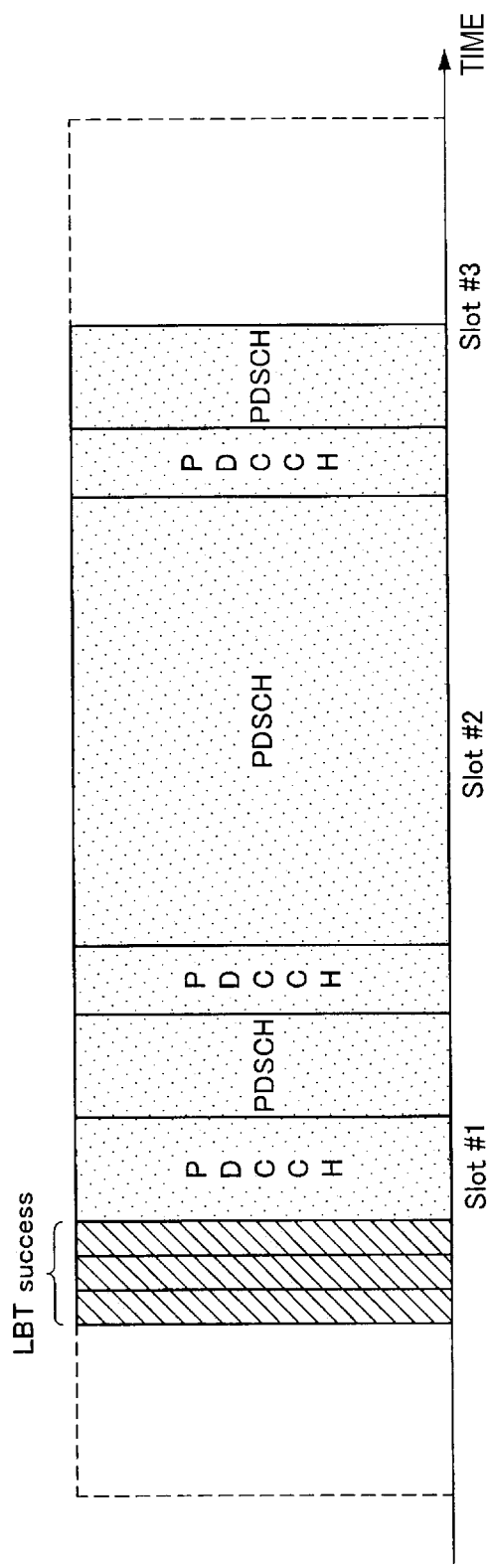
FIG. 11 is an explanatory diagram illustrating an example of blind detection of a PDCCH by the terminal device.

The terminal device 200 detects a PDCCH in a blind manner in every slot and/or in every mini slot. FIG. 11 is an explanatory diagram illustrating an example of blind detection of the PDCCH by the terminal device 200. The terminal device 200 recognizes the channel as a downlink in a case where the terminal device 200 can perform decoding as a result of the blind detection. Here, the PDCCH is preferably a PDCCH (common PDCCH) which is transmitted in search space common to terminals. Examples of such a PDCCH can include, for example, a PDCCH which carriers a slot format indicator (SFI), and a PDCCH which carriers a pre-emption indicator. The SFI is included in a DCI format 2_0, and the pre-emption indicator is included in a DCI format 2_1. Note that the mini slot is a slot which is transmitted/received from a portion other than the head of the slot. Specifically, in the mini slot, a PDCCH region (CORESET) is set from symbols other than the head symbol of the slot. In the mini slot, a PDSCH or a PUSCH is arranged from symbols other than the head symbol of the slot.

(2) Based on DMRS of PDCCH

Figure 12:
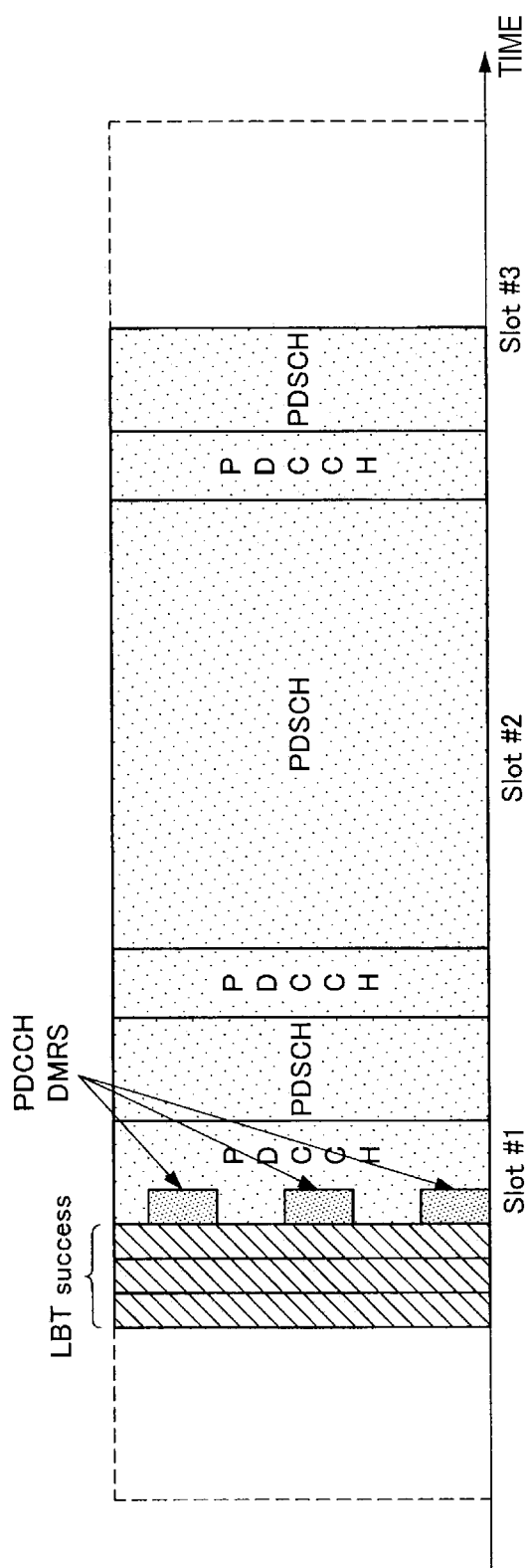
FIG. 12 is an explanatory diagram illustrating an example of a position of a DMRS included in the PDCCH.

The terminal device 200 may detect a downlink on the basis of a demodulation reference signal (DMRS) of the PDCCH. FIG. 12 is an explanatory diagram illustrating an example of a position of the DMRS included in the PDCCH. For example, in a case where received power of the DMRS used in the PDCCH is equal to or greater than a fixed level, the terminal device 200 recognizes the channel as a downlink. Meanwhile, in a case where the received power of the DMRS is equal to or less than a fixed level, the terminal device 200 recognizes the channel as a non-downlink.

(3) Based on Preamble

In a case where the downlink is recognized using the method of the above-described (1) or (2), there is a possibility that power consumption may increase as a result of the terminal device 200 performing blind detection, and detection accuracy may change due to non-constant transmission power of the DMRS, that is, fluctuation of coverage. The terminal device 200 according to the present embodiment therefore may detect a downlink on the basis of a signal which accompanies the head of the downlink (preamble signal, wake-up signal).

Figure 13:
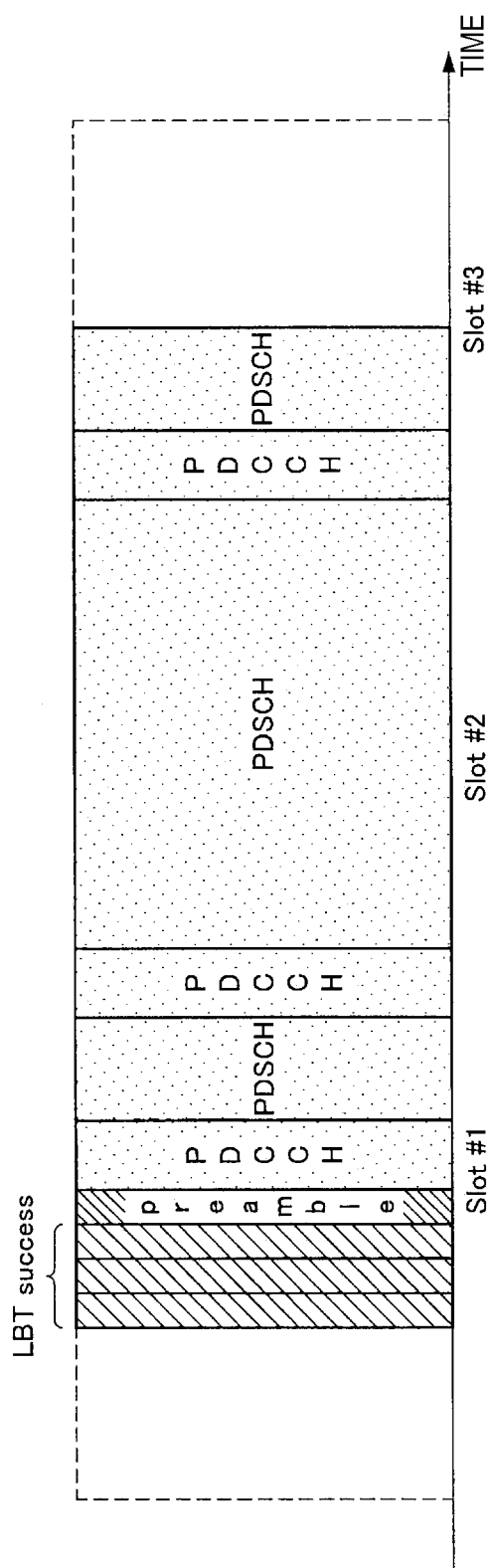
FIG. 13 is an explanatory diagram illustrating an example of a preamble signal which accompanies the head of a downlink.

FIG. 13 is an explanatory diagram illustrating an example of a preamble signal which accompanies the head of the downlink. The terminal device 200 may detect a downlink on the basis of only this preamble signal. Further, the terminal device 200 may detect a downlink using a predetermined reference signal (for example, a CSI-RS or an RLM-RS) in addition to or in place of the preamble signal. The terminal device 200 then starts PDCCH monitoring after detecting a downlink using the preamble signal transmitted from the base station device 100.

(4) Detection Based on Notification from Another Carrier

In a case where the terminal device 200 performs communication with the base station device 100 through carrier aggregation, the terminal device 200 may detect a downlink on the basis of a notification indicating that the channel is a downlink from another carrier. In a case where the base station device 100 makes a notification using the SFI, the base station device 100 may make a notification of F (flexible, unknown) or may create a new state of a slot format (such as, for example, empty, not occupied and busy) as a notification method in a case where the channel cannot be acquired. Further, the terminal device 200 may determine that the channel cannot be acquired in the corresponding slot in a case where SFI is not transmitted, and the base station device 100 makes a notification of a state of a slot format (one of D, U and F) in a case where the channel can be acquired.

(5) Others

The terminal device 200 may determine that a downlink is detected in a case where one of the above-described conditions (1) to (4) or a plurality of conditions among the above-described conditions (1) to (4) are satisfied.

This preamble signal can be generated to be used for detecting a downlink, reducing PDCCH monitoring, achieving coexistence and reutilizing space. Further, as illustrated in FIG. 13, this preamble signal is arranged at the head of the signal to be transmitted from the base station device 100. The preamble signal may be transmitted in every symbol from the base station device 100 or may be transmitted once every several symbols. A transmission cycle of the preamble signal may be associated with or independent of a cycle of the PDCCH. The transmission cycle of the preamble signal is preferably independent of the cycle of the PDCCH in view of suppression of power to be used by the terminal device 200. Further, a plurality of preamble signals may be provided within a channel occupancy time (COT). In a case where the preamble signal is provided within the COT, the preamble signal may be provided at the head of the slot or may be provided in the middle of the slot. In either case, the preamble signal is arranged on a one-slot cycle.

The preamble signal preferably includes one or two symbols. The preamble signal may be used to measure an RRM/RLM/CSI. In this case, the preamble signal can be set as one of the RLM-RSs.

The transmission power of the preamble signal is preferably fixed if the preamble signal is used to measure an RRM/RLM. The transmission power of the preamble signal may be set at the terminal device by a higher-order (upper) layer. A power ratio between the DMRS of the PDCCH and the preamble signal may be set at the terminal device by a higher-order (upper) layer.

The terminal device 200 starts monitoring of the PDCCH in the mini slot in a case where the preamble signal is detected. In monitoring of the PDCCH in the mini slot, the PDCCH is monitored in the middle of the slot. This is configured as a CORESET Configuration associated with the preamble signal, which is different from a normal CORESET Configuration. The terminal device 200 monitors the PDCCH on the basis of a slot in a case where the preamble signal is not detected. This is configured as a CORESET Configuration which is not associated with a start signal.

At least the preamble signal and the DMRS of the common PDCCH (including the SFI) are quasi co-locations (QCLs). The terminal device performs signal processing assuming that the preamble signal and the DMRS of the common PDCCH are QCLs.

Figure 14:
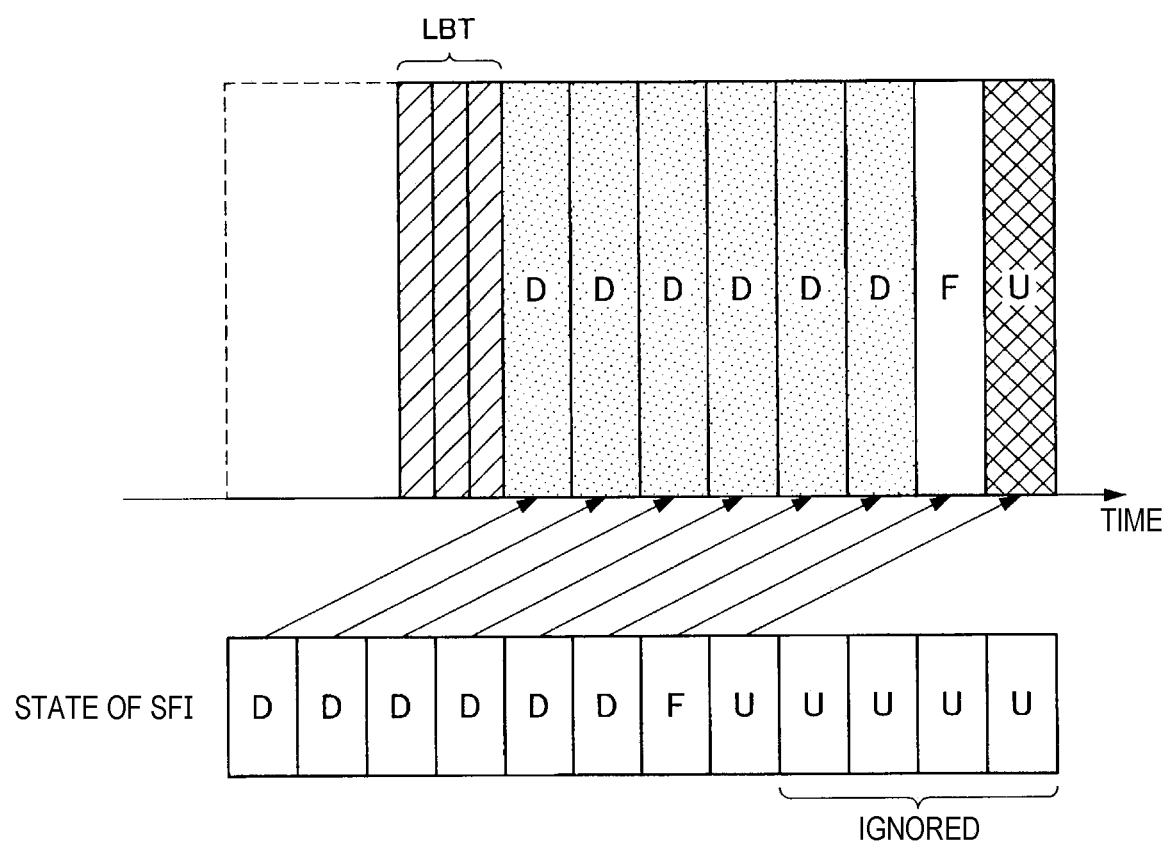
FIG. 14 is an explanatory diagram illustrating an example of relationship between a state of a downlink or an uplink and a state of an SFI.

In a case where a channel can be acquired in the middle of the slot, the terminal device 200 transmits the SFI even in the middle of the slot (even in the mini slot) in a case where the channel can be freely changed between the downlink and the uplink. In a configuration of the SFI to be transmitted in the N-th symbol, the head of the SFI may correspond to the N-th symbol (that is, symbols after the N+1-th symbol are not used). FIG. 14 is an explanatory diagram illustrating an example of relationship between a state of the downlink or the uplink and the state of the SFI. In this example, rear five symbols are ignored.

Figure 15:
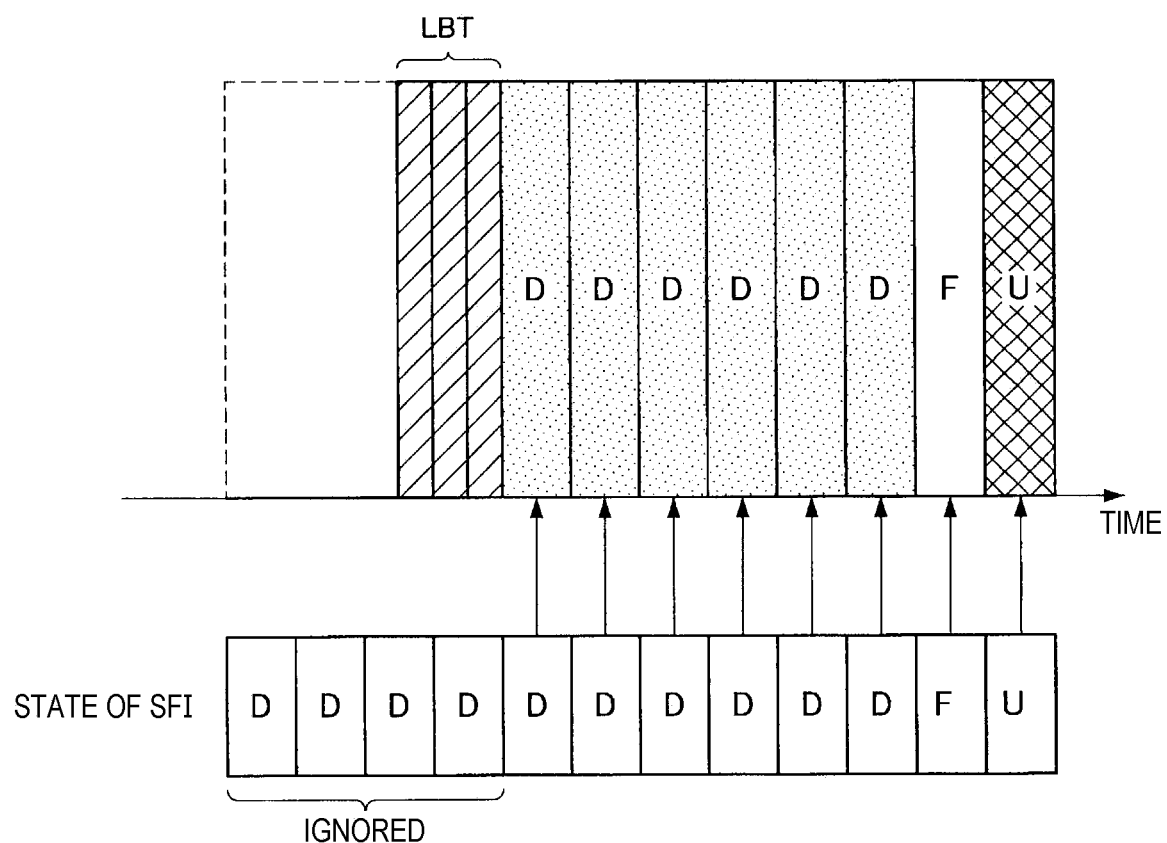
FIG. 15 is an explanatory diagram illustrating an example of relationship between a state of a downlink or an uplink and a state of an SFI.

Further, in the configuration of the SFI to be transmitted in the N-th symbol, the N-th SFI may correspond to the N-th symbol (that is, symbols before the N-th symbol are not used). FIG. 15 is an explanatory diagram illustrating an example of relationship between a state of the downlink or the uplink and the state of the SFI. In this example, the head five symbols are ignored.

Figure 16:
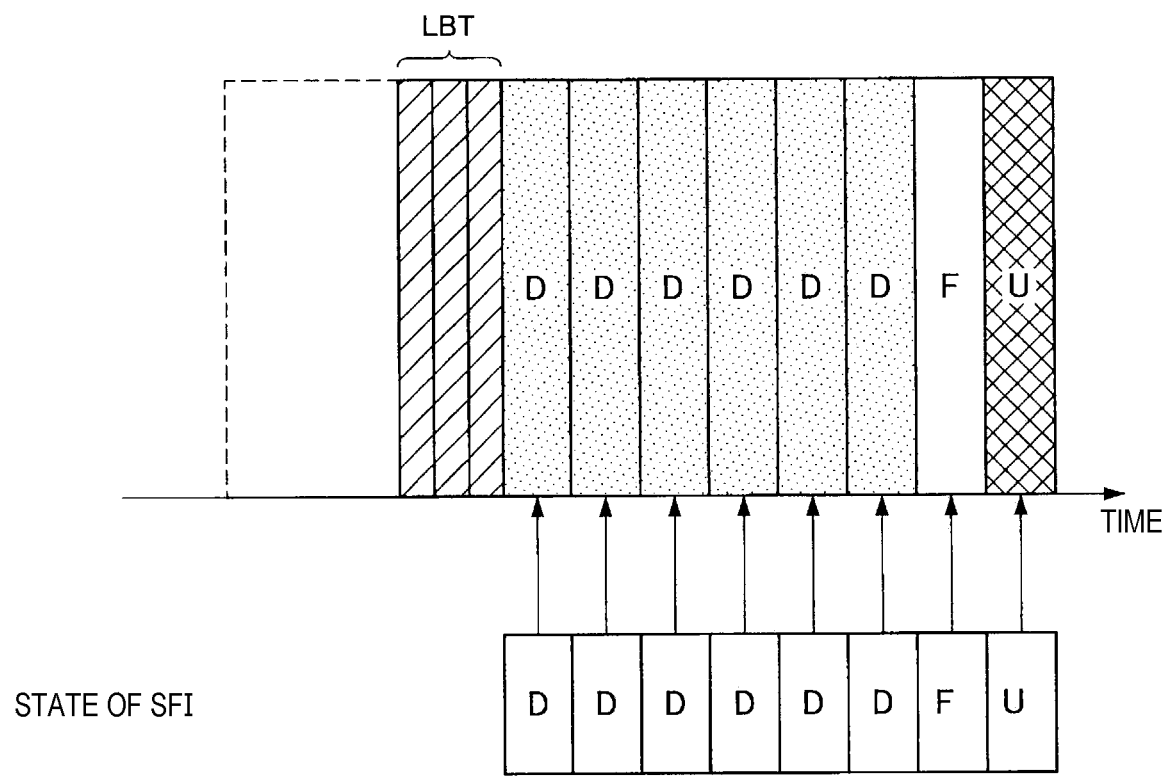
FIG. 16 is an explanatory diagram illustrating an example of relationship between a state of a downlink or an uplink and a state of an SFI.

Further, in the configuration of the SFI to be transmitted in the N-th symbol, a new SFI state corresponding to 1 to N may be defined. FIG. 16 is an explanatory diagram illustrating an example of relationship between a state of the downlink or the uplink and the state of the SFI.

In a case where a channel can be acquired in the middle of the slot, the terminal device 200 may determine that the remaining of the slot which starts halfway are all downlinks in a case where the channel cannot be freely changed between the downlink and the uplink. Further, in a case where a channel can be acquired in the middle of the slot, the terminal device 200 may determine that the symbol which starts halfway is a downlink, and the several symbols (for example, one to three symbols) in the rear part of the slot are uplinks in a case where the channel cannot be freely changed between the downlink and the uplink. Note that in this event, in a case where a channel can be acquired in several symbols in the rear part of the slot, the terminal device 200 may determine that the remaining symbols are all downlinks.

The preamble signal may be based on a PSS/SSS, may be based on a CSI-RS or may be based on a phase tracking reference signal (PT-RS), or the resource may be indicated in the PBCH from the base station device 100. The preamble signal includes at least a cell ID to recognize transmission from the serving cell. The terminal device identifies a signal from the service cell with the cell ID included in the preamble signal. The preamble signal can include a signal sequence corresponding to the cell ID. The preamble signal may include information for identifying a beam. Examples of the information for identifying a beam can include, for example, an index (Preamble index) which identifies different preambles. Further, in a case where coordination between operators is performed, the preamble signal may include an operator ID (for example, a PLMN). The operator ID can be needed to perform high-efficient operation in frame based equipment (FBE).

Figure 17:
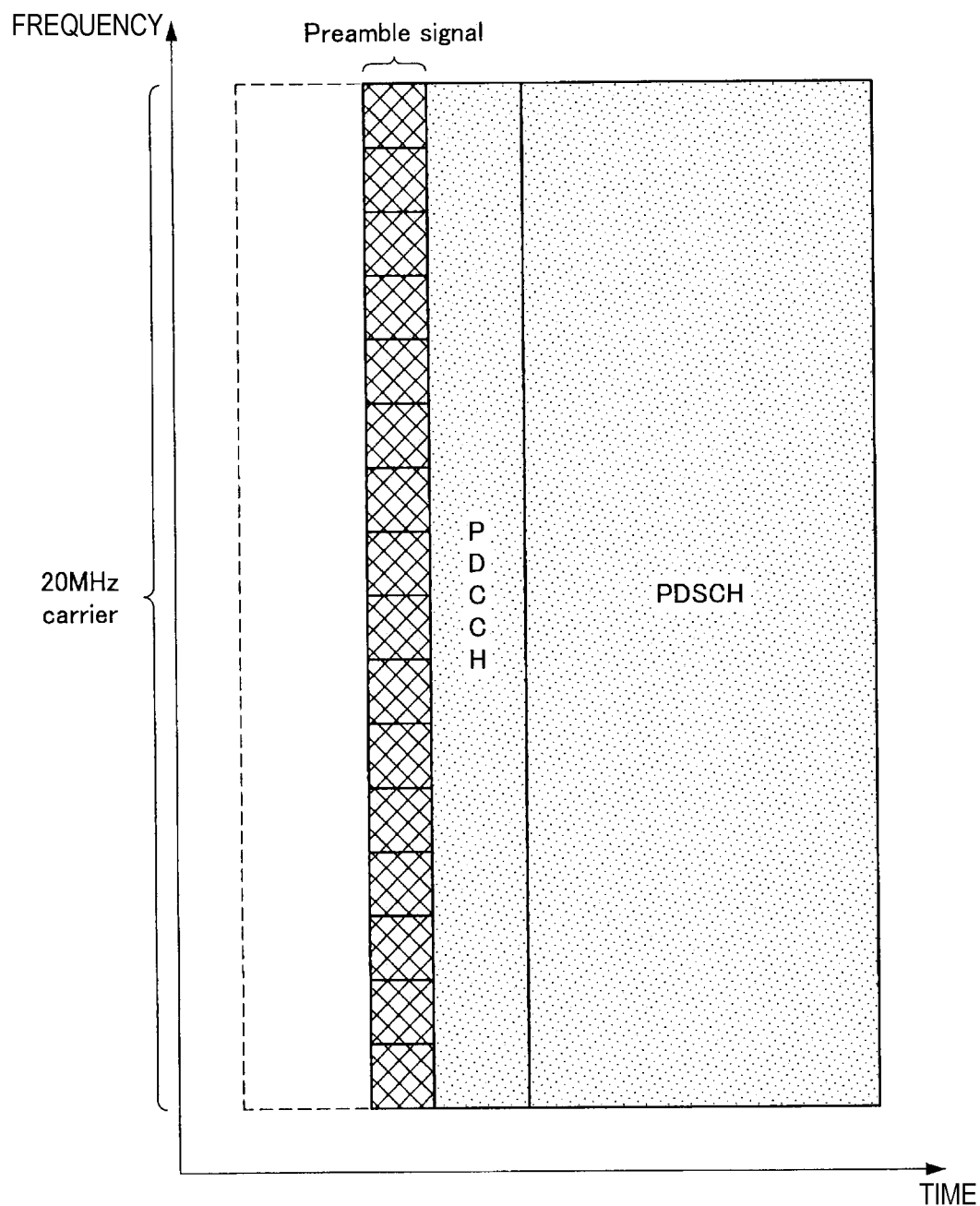
FIG. 17 is an explanatory diagram illustrating a configuration example of the preamble signal.

The preamble signal may include one type of a sequence and one symbol. FIG. 17 is an explanatory diagram illustrating a configuration example of the preamble signal. In the preamble signal having this configuration, a sequence such as a ZC sequence and an m sequence, having high orthogonality (having lower mutual correlation) which allows separation even if contention occurs (even if the same resource is used) is preferably used.

Figure 18:
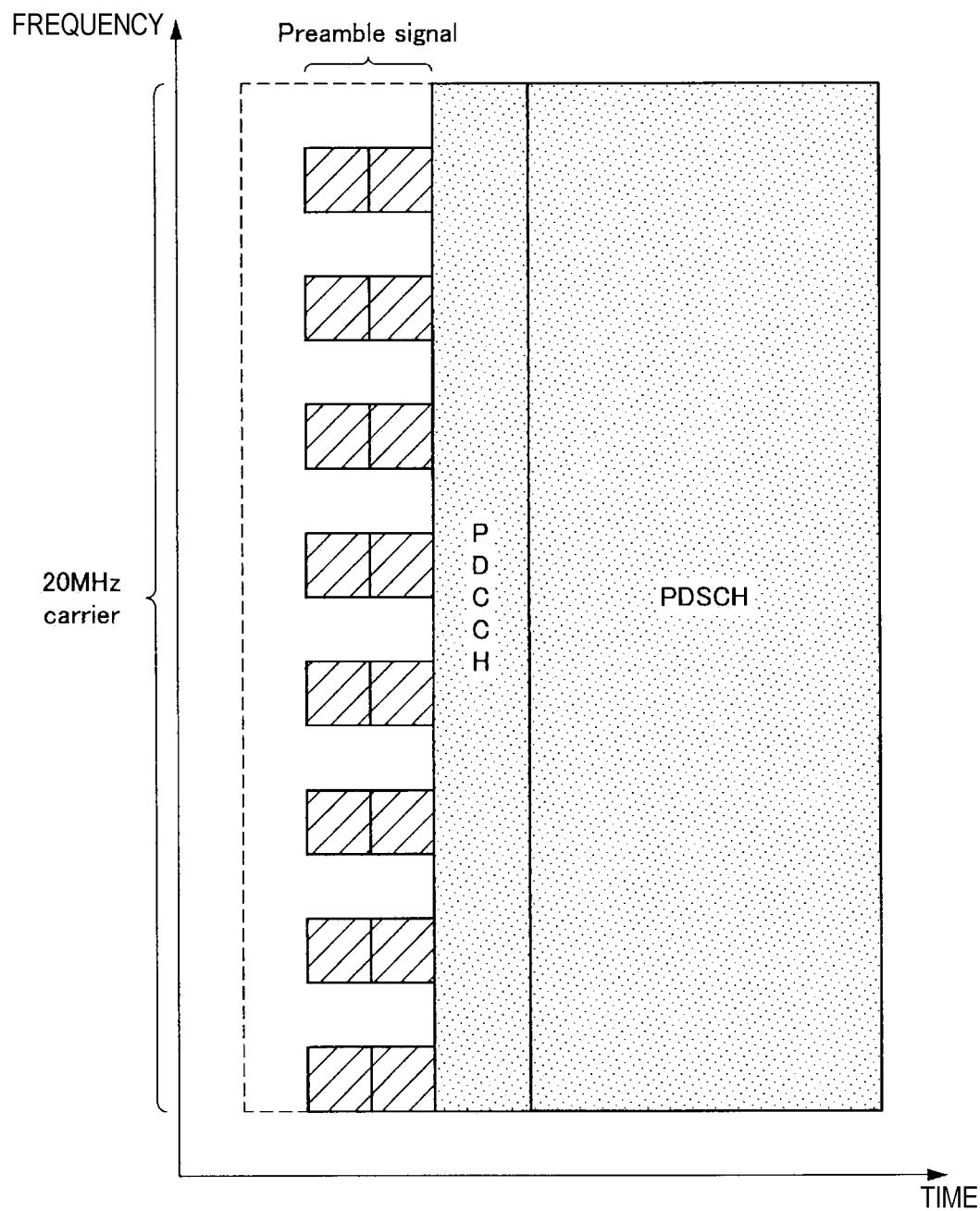
FIG. 18 is an explanatory diagram illustrating a configuration example of the preamble signal.

The preamble signal may include one type of a sequence and two or more symbols. FIG. 18 is an explanatory diagram illustrating a configuration example of the preamble signal. In this configuration, resources are allocated in an interlaced manner on a frequency axis. This configuration enables use of frequency resources different between cells by reuse of frequencies, so that it is possible to improve a detection rate. In this preamble signal, a sequence such as a gold sequence, having a large number of orthogonal sequences may be used.

Figure 19:
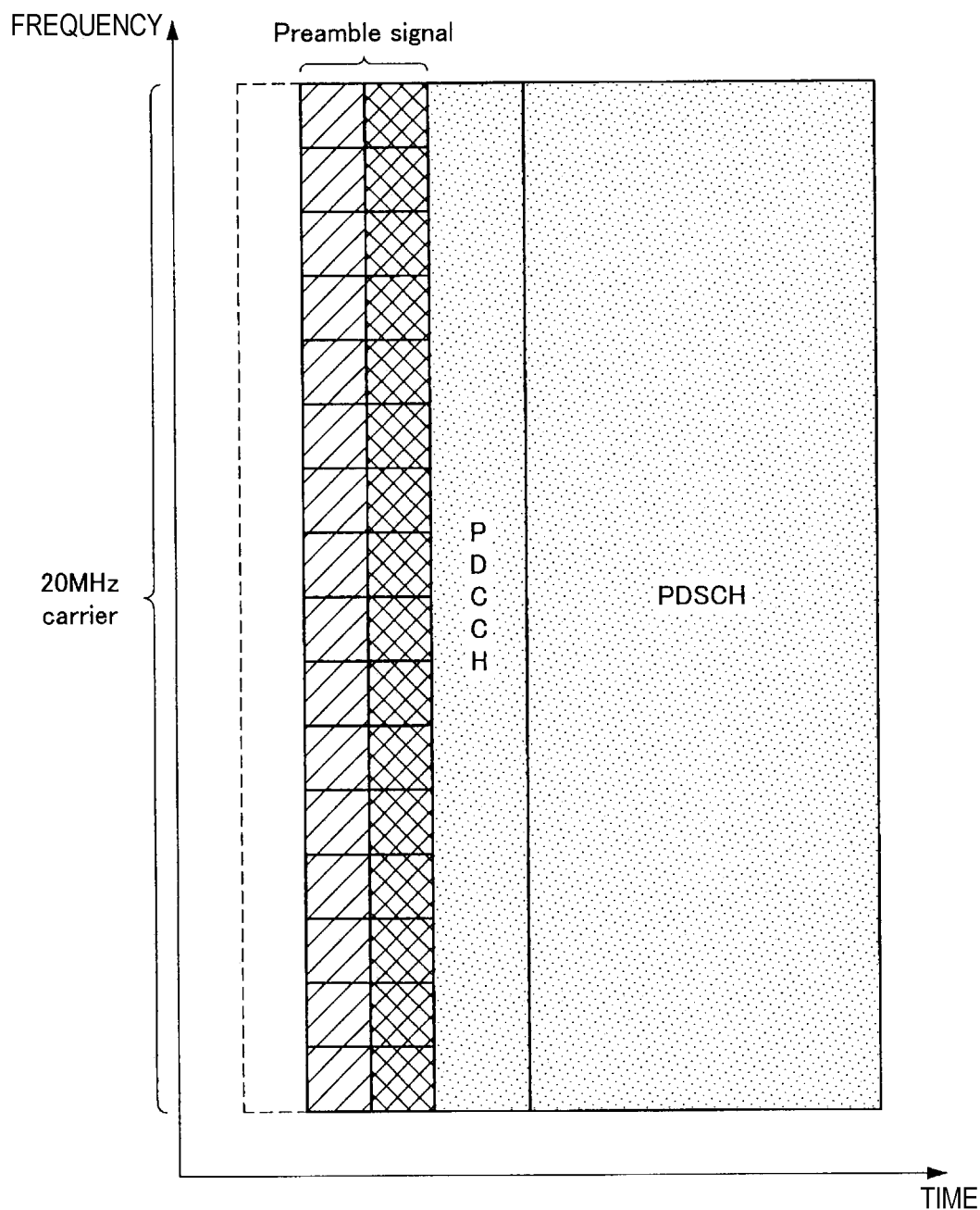
FIG. 19 is an explanatory diagram illustrating a configuration example of the preamble signal.

The preamble signal may include a combination of two types of sequences and two or more symbols. FIG. 19 is an explanatory diagram illustrating a configuration example of the preamble signal. In this preamble signal, sequences having different property such as a sequence such as a ZC sequence and an m sequence, having higher orthogonality and a sequence such as a gold sequence, having a larger number of orthogonal sequences are preferably used in combination. This configuration enables use of a plurality of sequences having different characteristics, so that it is possible to construct an appropriate signal sequence in accordance with applications. For example, a sequence (for example, a ZC sequence) having low detection load is applied as the first sequence to detect the downlink by the terminal device, and a sequence (for example, an m sequence) having lower mutual correlation is applied as the second sequence to achieve coexistence and reutilize space.

Figure 20:
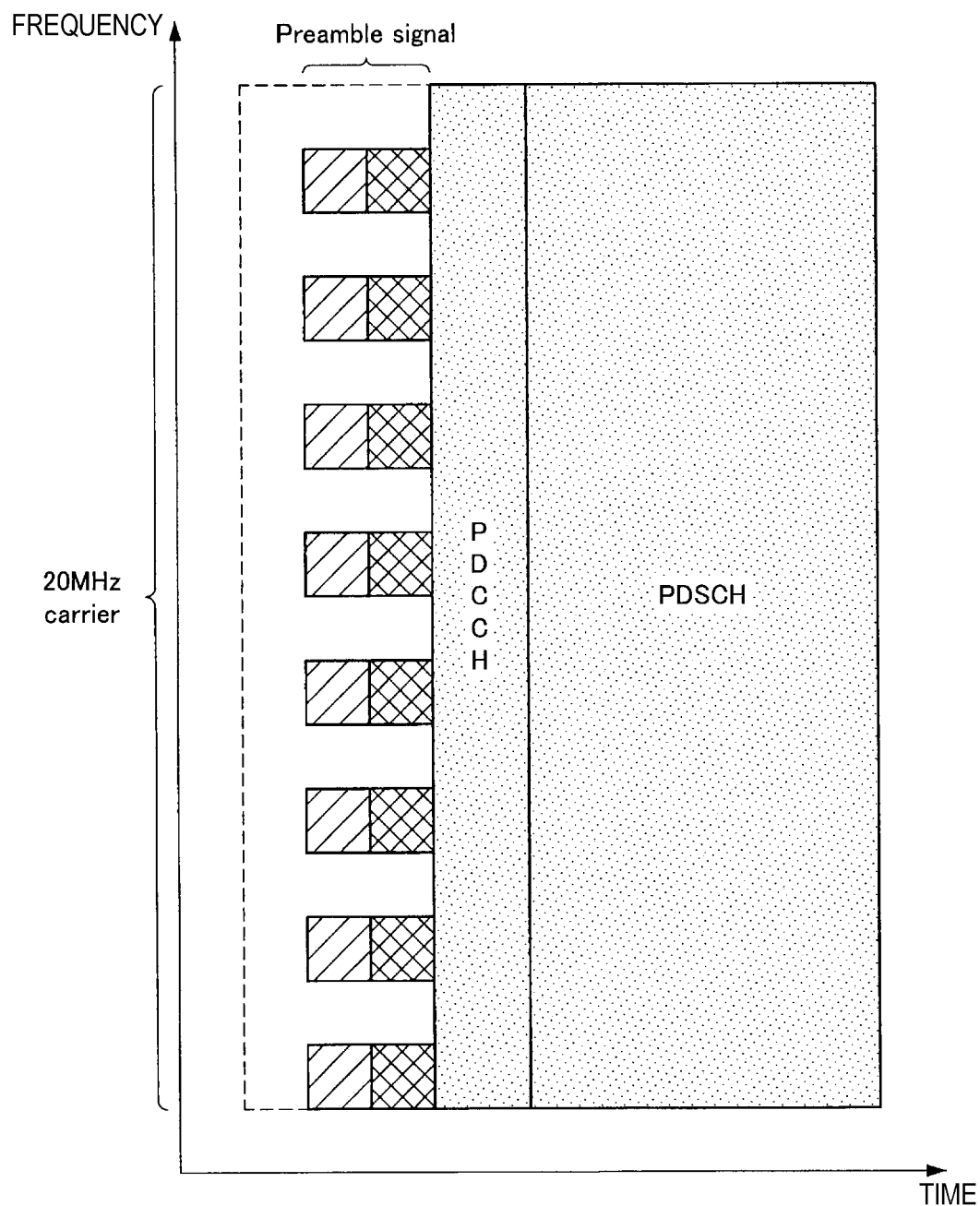
FIG. 20 is an explanatory diagram illustrating a configuration example of the preamble signal.

In the configuration of the preamble signal illustrated in FIG. 19, frequency resources may be further allocated in an interlaced manner. FIG. 20 is an explanatory diagram illustrating a configuration example of the preamble signal, and illustrates a configuration where frequency resources are allocated in an interlaced manner.

Figure 21:
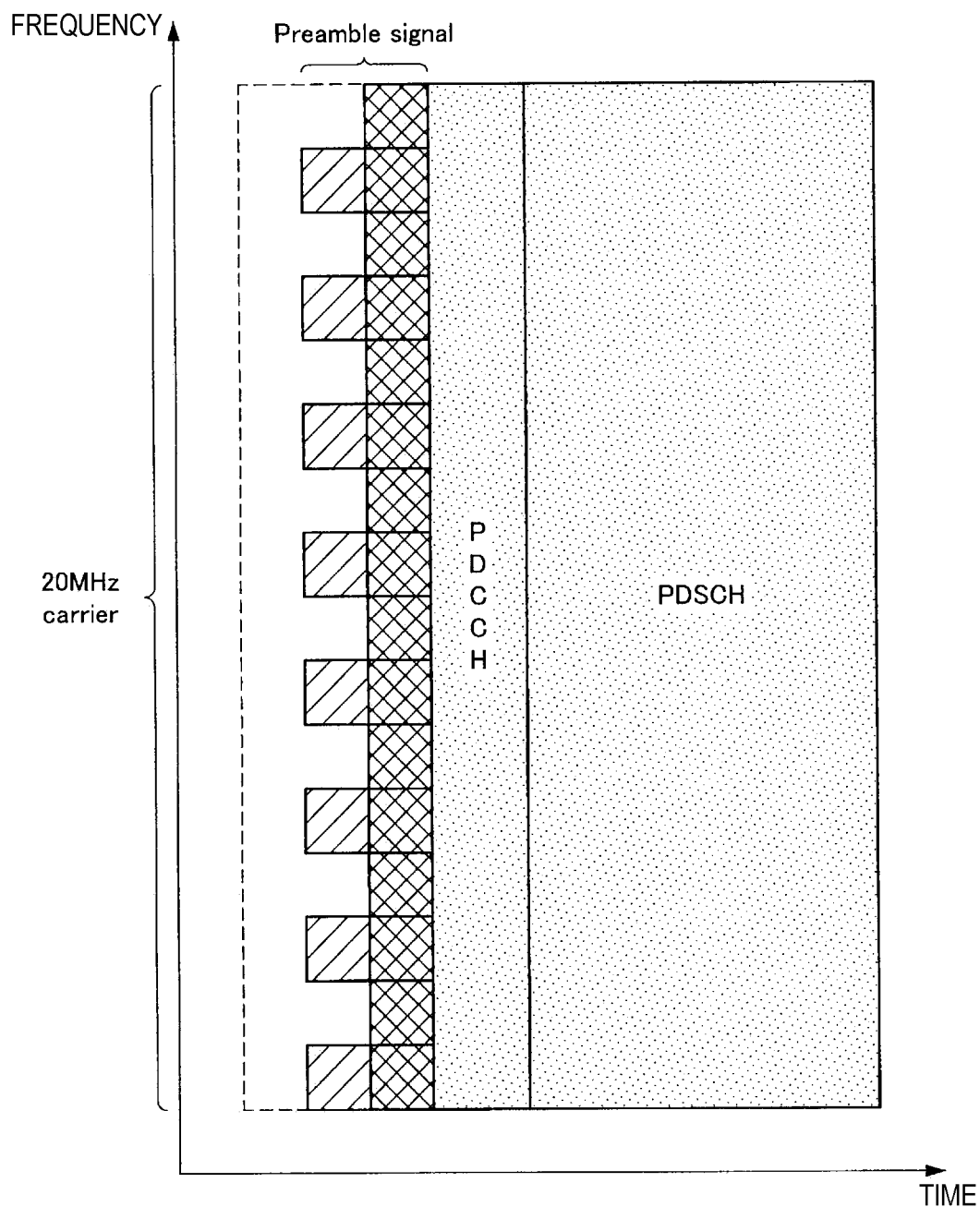
FIG. 21 is an explanatory diagram illustrating a configuration example of the preamble signal.

In the configuration of the preamble signal illustrated in FIG. 19, frequency resources may be allocated to only one type of one symbol in an interlaced manner. FIG. 21 is an explanatory diagram illustrating a configuration example of the preamble signal and illustrates a configuration where frequency resources are allocated to only one type of one symbol in an interlaced manner.

Figure 22:
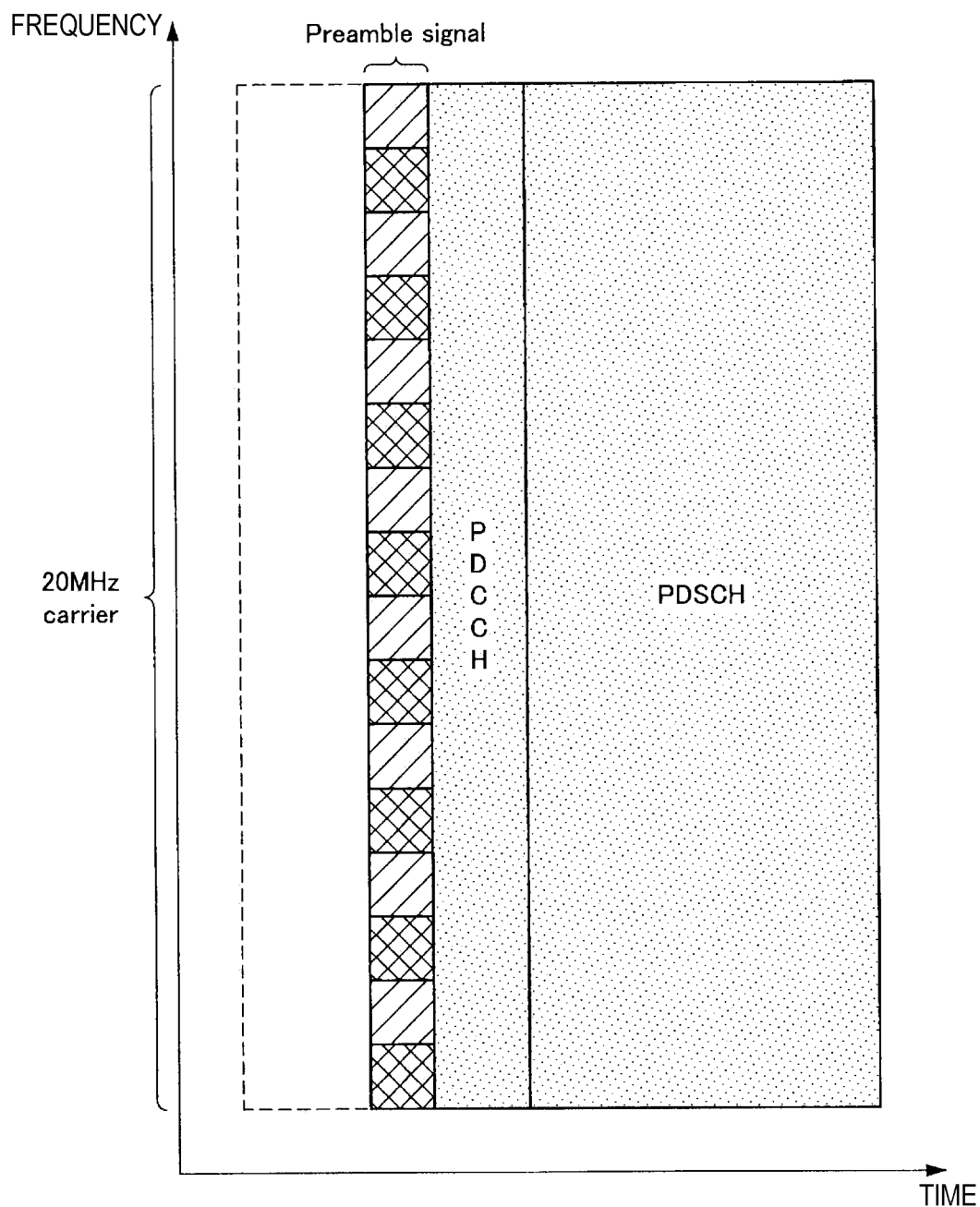
FIG. 22 is an explanatory diagram illustrating a configuration example of the preamble signal.

In the preamble signal, two or more types of sequences may be alternately arranged. FIG. 22 is an explanatory diagram illustrating a configuration example of the preamble signal and illustrates a configuration where two types of sequences are alternately arranged. This configuration enables transmission of a plurality of types of sequences in one symbol.

Figure 23:
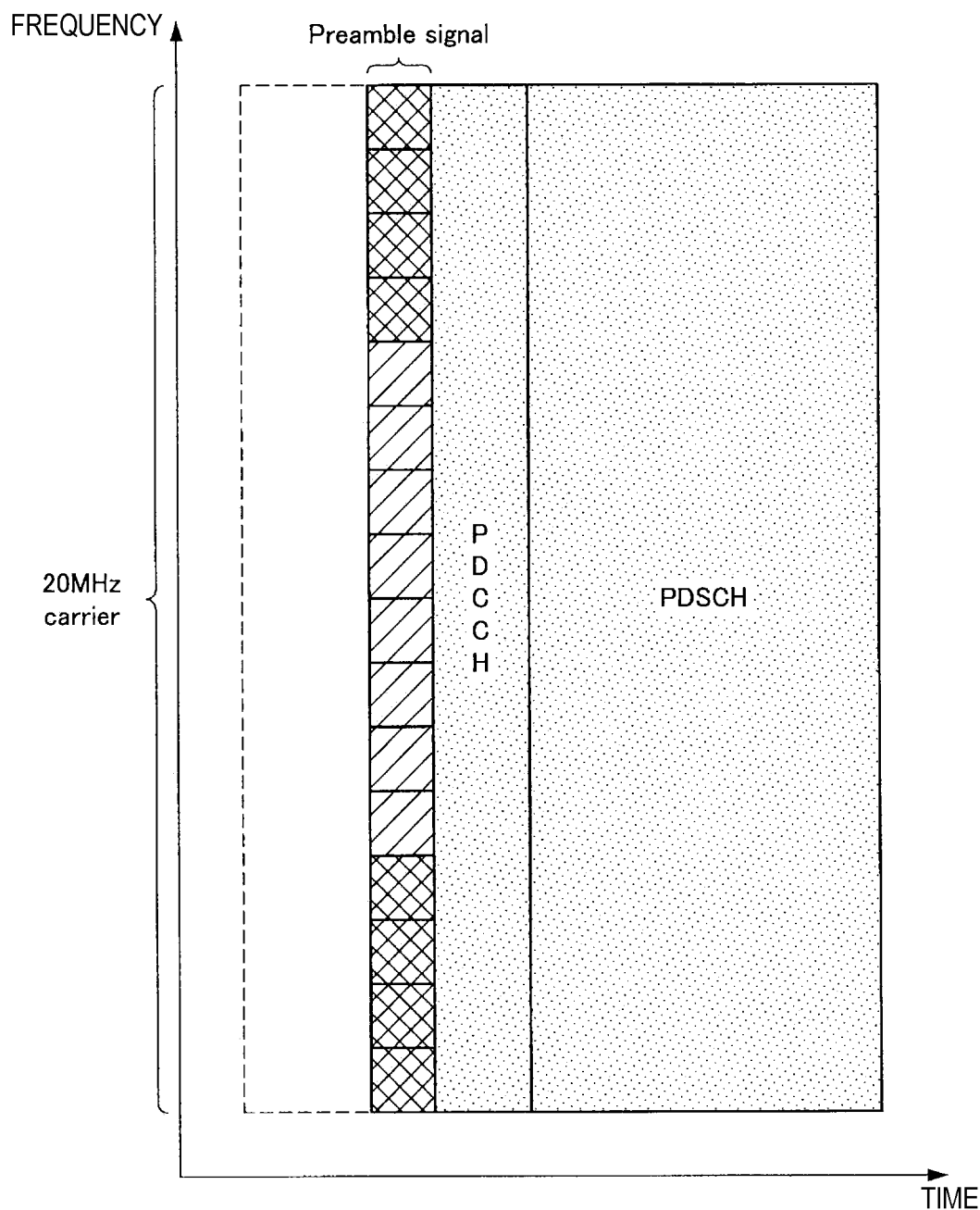
FIG. 23 is an explanatory diagram illustrating a configuration example of the preamble signal.

The preamble signal may employ a configuration where the first sequence is arranged at the center of the carrier, and the second sequence is multiplexed on the remaining frequency. FIG. 23 is an explanatory diagram illustrating a configuration example of the preamble signal. Such a configuration facilitates synchronization with a carrier center frequency by the first sequence.

Figure 24:
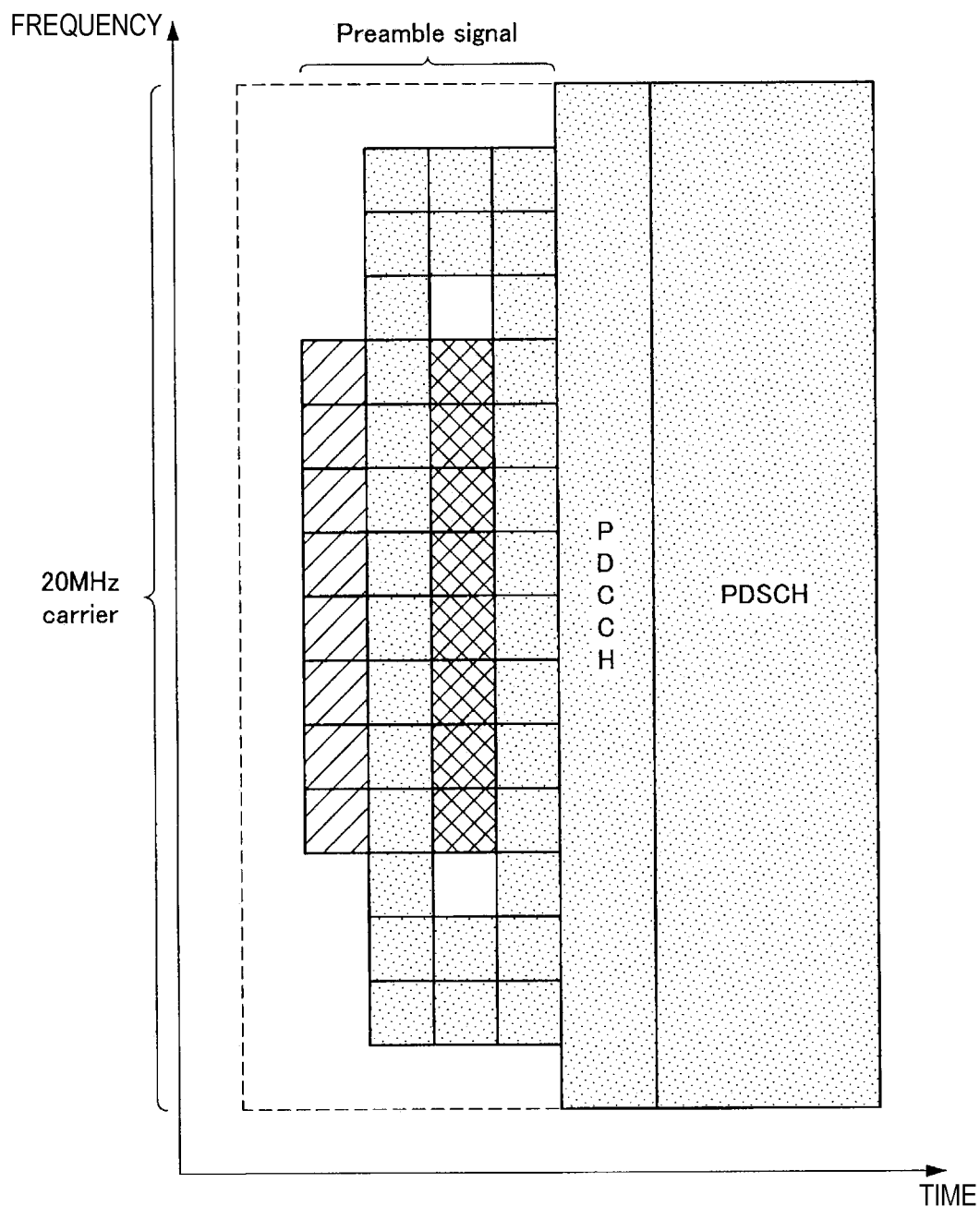
FIG. 24 is an explanatory diagram illustrating a configuration example of the preamble signal.

The SS/PBCH block may be used as the preamble signal. FIG. 24 is an explanatory diagram illustrating a configuration example of the preamble signal. Such a configuration enables use of the preamble signal as a discovery signal or a signal for initial access. Further, such a configuration can improve a transmission frequency of the SS/PBCH block.

By executing such operations, the base station device 100 and the terminal device 200 are capable of using resources efficiently in an NR-U. Among the configuration of the base station device 100 illustrated in FIG. 9, the setting unit 151 sets the various settings described above for using resources efficiently in an NR-U. Additionally, the communication processing unit 153 executes a process of notifying the terminal device 200 of the content set by the setting unit 151.

Additionally, among the configuration of the terminal device 200 illustrated in FIG. 10, the information acquisition unit 241 acquires various settings transmitted from the base station device 100. The communication processing unit 243 executes a process of communicating wirelessly with the base station device 100 in an NR-U on the basis of the various settings acquired by the information acquisition unit 241.

[1.5. Others]

<SS/PBCH Block>

The SS/PBCH block in the NR-U may be transmitted at a subcarrier interval of 60 kHz. Use of the subcarrier interval of 60 kHz enables a burst set of the SS/PBCH block to fall within one subframe.

<Discovery Signal>

In the NR-U, a discovery signal is used for at least cell discovery (cell detection) and RRM measurement. Further, the discovery signal may be used for RLM measurement, CSI measurement and transmission of system information (SI) and paging.

The discovery signal includes one or more SS/PBCH blocks. The discovery signal includes up to eight SS/PBCH blocks in a case where a carrier frequency is equal to or lower than 6 GHz, and includes up to 64 SS/PBCH blocks in a case where the carrier frequency is equal to or higher than 6 GHz.

The PBCH to be transmitted in the discovery signal may include information indicating that the signal is the discovery signal. The PBCH to be transmitted in the discovery signal may include two pieces of information of information indicating an index of the SS/PBCH block and information indicating a slot index. Further, the PBCH to be transmitted in the discovery signal may include information for identifying an operator. Still further, the PBCH to be transmitted in the discovery signal may include information regarding reutilization of space (such as, for example, a congestion degree, transmission power, an SINR, a channel sensing threshold and beam information). The base station device and the terminal device may control transmission power and/or a channel sensing threshold on the basis of this information regarding the transmission power.

The discovery signal in the present embodiment may include a PDSCH and a PDCCH which carry a CSI-RS, an SIB1 and paging in addition to the SS/PBCH block. The SS/PBCH block and the CSI-RS may be multiplexed on a frequency axis or may be multiplexed on a time axis.

<RLM>

(1) RLM Measurement Based on Designation/Detection of Downlink

RLM measurement in an unlicensed band may be performed on the basis of designation or detection of a downlink. The terminal device performs RLM measurement in a slot designated as the downlink or in a slot which can be detected as the downlink. Meanwhile, the terminal device does not perform RLM measurement in a slot which is not designated as the downlink or in a slot which cannot be detected as the downlink.

(2) RLM Measurement Using Aperiodic Signal

RLM measurement in an unlicensed band may be performed on the basis of an aperiodic signal. The aperiodic signal is a signal for which resources are indicated in the PDCCH from the base station device, or the preamble signal. The terminal device performs RLM measurement using the aperiodic signal. The terminal device may perform RLM measurement using only the aperiodic signal or may perform RLM measurement using both the aperiodic signal and a periodic signal, and the base station device preferably makes operation settings.

(3) RLM Measurement Using Discovery Signal

RLM measurement in an unlicensed band may be performed on the basis of a discovery signal. The terminal device performs RLM measurement using the discovery signal. In this case, the terminal device assumes that a reference signal for RRM measurement and a reference signal for RLM measurement are QCLs.

A period during which RLM measurement is evaluated can be changed. Specifically, an evaluation period of an unlicensed band can be set longer than an evaluation period of a licensed band. A notification of the evaluation period is made through the upper layer (RRC signaling). The notified evaluation period may be irrelevant to the cycle of the SS/PBCH.

<2. Application Examples>

The technology according to the present disclosure can be applied to various products. For example, the base station device 100 may be realized as any type of evolved Node B (eNB) such as a macro eNB or a small eNB. The small eNB may be an eNB that covers a cell, such as a pico eNB, a micro eNB, or a home (femto) eNB, smaller than a macro cell. Instead, the base station device 100 may be realized as another type of base station such as a NodeB or a base transceiver station (BTS). The base station device 100 may include a main entity (also referred to as a base station device) that controls wireless communication and one or more remote radio heads (RRHs) disposed at different locations from the main entity. Further, various types of terminals to be described later may operate as the base station device 100 by performing a base station function temporarily or semi-permanently.

Further, for example, the terminal device 200 may be realized as a mobile terminal such as a smartphone, a tablet personal computer (PC), a notebook PC, a portable game terminal, a portable/dongle mobile router or a digital camera, or an in-vehicle terminal such as a car navigation device. Further, the terminal device 200 may be realized as a terminal that performs machine to machine (M2M) communication (also referred to as a machine type communication (MTC) terminal). Moreover, the terminal device 200 may be a wireless communication module mounted on the terminal (for example, an integrated circuit module configured on one die).

<2.1. Application Examples for Base Station Device>

(First Application Example)

Figure 25:
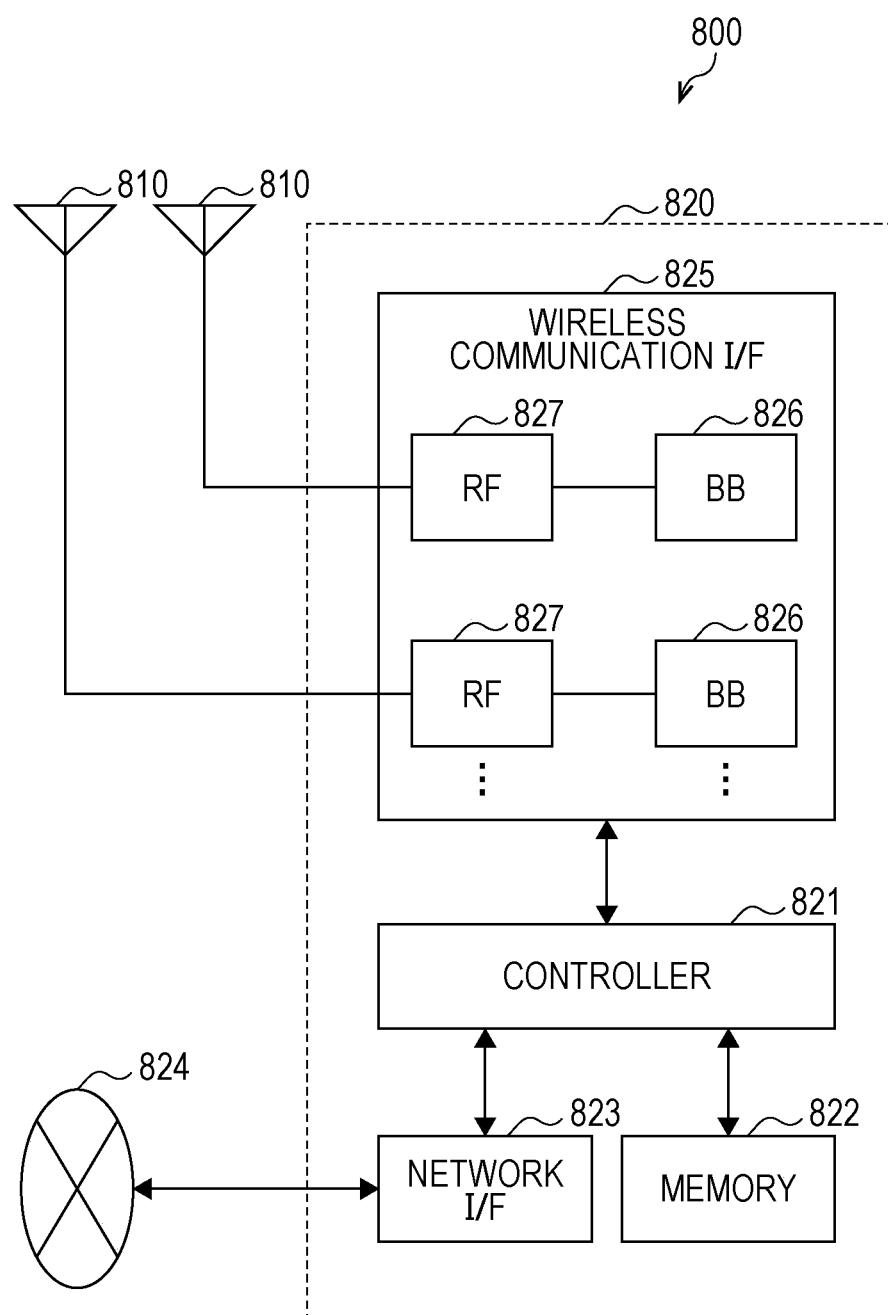
FIG. 25 is a block diagram illustrating a first example of a schematic configuration of an eNB to which the technology according to the present disclosure is applied.

FIG. 25 is a block diagram illustrating a first example of a schematic configuration of an eNB to which the technology according to the present disclosure may be applied. An eNB 800 includes one or more antennas 810 and a base station device 820. Each antenna 810 and the base station device 820 may be connected to each other via an RF cable.

Each of the antennas 810 includes a single or a plurality of antenna elements (e.g., a plurality of antenna elements constituting a MIMO antenna) and is used for the base station device 820 to transmit and receive a wireless signal. The eNB 800 may include the plurality of the antennas 810 as illustrated in FIG. 25, and the plurality of antennas 810 may, for example, correspond to a plurality of frequency bands used by the eNB 800. It should be noted that while FIG. 25 illustrates an example in which the eNB 800 includes the plurality of antennas 810, the eNB 800 may include the single antenna 810.

The base station device 820 includes a controller 821, a memory 822, a network interface 823, and a wireless communication interface 825.

The controller 821 may be, for example, a CPU or a DSP, and operates various functions of an upper layer of the base station device 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station device 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station device 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 25, and the plurality of BB processors 826 may, for example, correspond to a plurality of frequency bands used by the eNB 800. Further, the wireless communication interface 825 may also include a plurality of the RF circuits 827, as illustrated in FIG. 35, and the plurality of RF circuits 827 may, for example, correspond to a plurality of antenna elements. Note that FIG. 25 illustrates an example in which the wireless communication interface 825 includes the plurality of BB processors 826 and the plurality of RF circuits 827, but the wireless communication interface 825 may include the single BB processor 826 or the single RF circuit 827.

One or more constituent elements (the setting unit 151 and/or the communication processing unit 153) included in the control unit 150 described with reference to FIG. 9 may be implemented in the wireless communication interface 825 in the eNB 800 shown in FIG. 25. Alternatively, at least some of these constituent elements may be implemented in the controller 821. As an example, the eNB 800 may be equipped with a module including a part (for example, the BB processor 826) or all of the wireless communication interface 825 and/or the controller 821, so that the one or more constituent elements described above may be implemented in the module. In this case, the above-described module may store a program for causing a processor to function as the one or more constituent elements (in other words, a program for causing the processor to perform the operation of the one or more constituent elements), and may execute the program. As another example, a program for causing a processor to function as the one or more constituent elements may be installed in the eNB 800 and executed by the wireless communication interface 825 (for example, the BB processor 826) and/or the controller 821. As described above, the eNB 800, the base station device 820, or the above-described module may be provided as an apparatus including the one or more constituent elements. Alternatively, a program for causing a processor to function as the one or more constituent elements may be provided. Moreover, a readable recording medium on which the above-described program has been recorded may be provided.

Furthermore, the wireless communication unit 120 described with reference to FIG. 9 may be implemented in the wireless communication interface 825 (for example, the RF circuit 827) in the eNB 800 shown in FIG. 25. In addition, the antenna unit 110 may be implemented on the antenna 810. Moreover, the network communication unit 130 may be implemented in the controller 821 and/or the network interface 823. Furthermore, the storage unit 140 may be implemented in the memory 822.

(Second Application Example)

Figure 26:
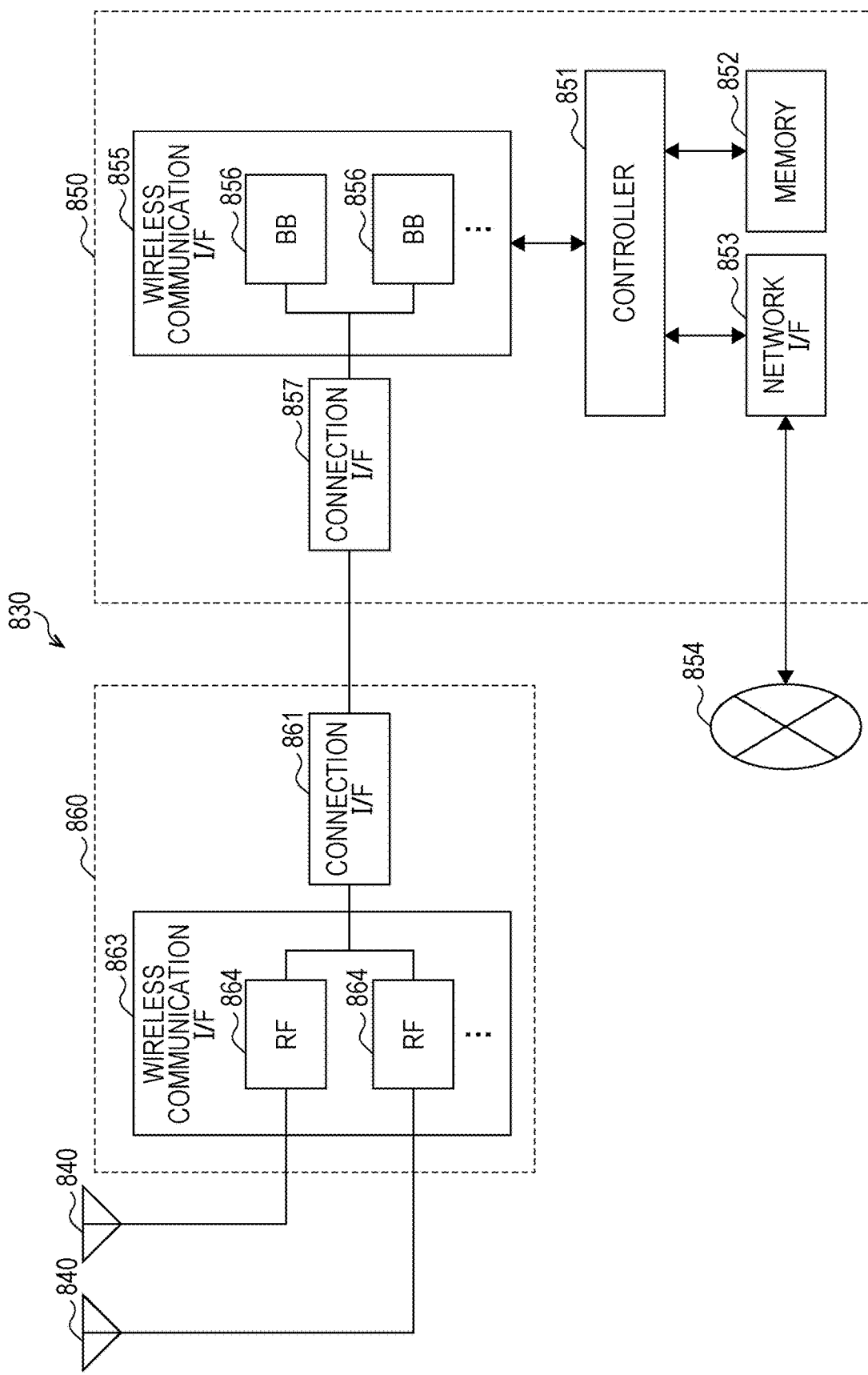
FIG. 26 is a block diagram illustrating a second example of a schematic configuration of an eNB to which the technology according to the present disclosure is applied.

FIG. 26 is a block diagram showing a second example of the schematic configuration of the eNB to which the technology according to the present disclosure can be applied. An eNB 830 includes one or more antennas 840, a base station device 850, and an RRH 860. Each antenna 840 and the RRH 860 can be connected to each other via an RF cable. Furthermore, the base station device 850 and the RRH 860 can be connected to each other via a high-speed line such as an optical fiber cable.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 26, and the plurality of antennas 840 may, for example, correspond to a plurality of frequency bands used by the eNB 830. Note that FIG. 26 illustrates an example in which the eNB 830 includes the plurality of antennas 840, but the eNB 830 may include the single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 25.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 25 except that the BB processor 856 is connected to an RF circuit 864 of the RRH 860 via the connection interface 857. The wireless communication interface 855 may include a plurality of the BB processors 856, as illustrated in FIG. 26, and the plurality of BB processors 856 may, for example, correspond to a plurality of frequency bands used by the eNB 830. Note that FIG. 26 illustrates an example in which the wireless communication interface 855 includes the plurality of BB processors 856, but the wireless communication interface 855 may include the single BB processor 856.

The connection interface 857 is an interface for connecting the base station device 850 (wireless communication interface 855) to the RRH 860. The connection interface 857 may be a communication module for communication on the high speed line which connects the base station device 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station device 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 26, and the plurality of RF circuits 864 may, for example, correspond to a plurality of antenna elements. Note that FIG. 26 illustrates an example in which the wireless communication interface 863 includes the plurality of RF circuits 864, but the wireless communication interface 863 may include the single RF circuit 864.

One or more constituent elements (the setting unit 151 and/or the communication processing unit 153) included in the control unit 150 described with reference to FIG. 9 may be implemented in the wireless communication interface 855 and/or the wireless communication interface 863 in the eNB 830 shown in FIG. 26. Alternatively, at least some of these constituent elements may be implemented in the controller 851. As an example, the eNB 830 may be equipped with a module including a part (for example, the BB processor 856) or all of the wireless communication interface 855 and/or the controller 851, so that the one or more constituent elements described above may be implemented in the module. In this case, the above-described module may store a program for causing a processor to function as the one or more constituent elements (in other words, a program for causing the processor to perform the operation of the one or more constituent elements), and may execute the program. As another example, a program for causing a processor to function as the one or more constituent elements may be installed in the eNB 830 and executed by the wireless communication interface 855 (for example, the BB processor 856) and/or the controller 851. As described above, the eNB 830, the base station device 850, or the above-described module may be provided as an apparatus including the one or more constituent elements. Alternatively, a program for causing a processor to function as the one or more constituent elements may be provided.

Moreover, a readable recording medium on which the above-described program has been recorded may be provided.

Furthermore, for example, the wireless communication unit 120 described with reference to FIG. 9 may be implemented in the wireless communication interface 863 (for example, the RF circuit 864) in the eNB 830 shown in FIG. 26. In addition, the antenna unit 110 may be implemented on the antenna 840. Moreover, the network communication unit 130 may be implemented in the controller 851 and/or the network interface 853. Furthermore, the storage unit 140 may be implemented in the memory 852.

<2.2. Application Examples for Terminal Device>

(First Application Example)

Figure 27:
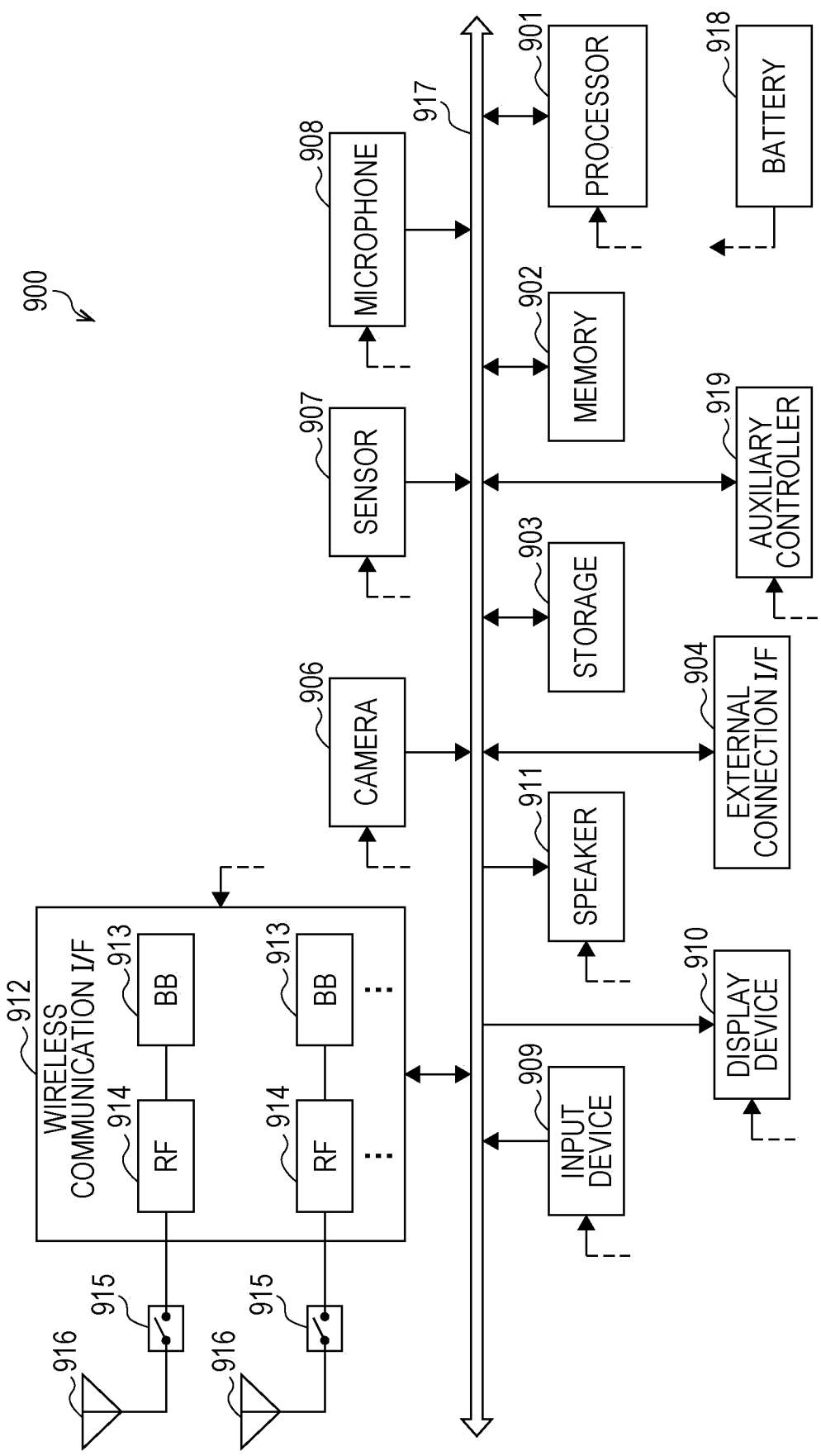
FIG. 27 is a block diagram illustrating an example of a schematic configuration of a smartphone to which the technology according to the present disclosure is applied.

FIG. 27 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 27. Note that FIG. 27 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 27. Note that FIG. 27 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 27 via a feeder line that is partially illustrated in the figure as a dashed line. The auxiliary controller 919, for example, operates a minimally necessary function of the smartphone 900 in a sleep mode.

One or more constituent elements (an acquisition unit 241 and/or the communication processing unit 243) included in the control unit 240 described with reference to FIG. 10 may be implemented in the wireless communication interface 912 in the smartphone 900 shown in FIG. 27. Alternatively, at least some of these constituent elements may be implemented in the processor 901 or the auxiliary controller 919. As an example, the smartphone 900 may be equipped with a module including a part (for example, the BB processor 913) or all of the wireless communication interface 912, the processor 901, and/or the auxiliary controller 919, so that the one or more constituent elements described above may be implemented in the module. In this case, the above-described module may store a program for causing a processor to function as the one or more constituent elements (in other words, a program for causing the processor to perform the operation of the one or more constituent elements), and may execute the program. As another example, a program for causing a processor to function as the one or more constituent elements may be installed in the smartphone 900 and executed by the wireless communication interface 912 (for example, the BB processor 913), the processor 901, and/or the auxiliary controller 919. As described above, the smartphone 900 or the above-described module may be provided as an apparatus including the one or more constituent elements. Alternatively, a program for causing a processor to function as the one or more constituent elements may be provided. Moreover, a readable recording medium on which the above-described program has been recorded may be provided.

Furthermore, for example, the wireless communication unit 220 described with reference to FIG. may be implemented in the wireless communication interface 912 (for example, the RF circuit 914) in the smartphone 900 shown in FIG. 27. In addition, the antenna unit 210 may be implemented on the antenna 916. Furthermore, the storage unit 230 may be implemented in the memory 902.

(Second Application Example)

Figure 28:
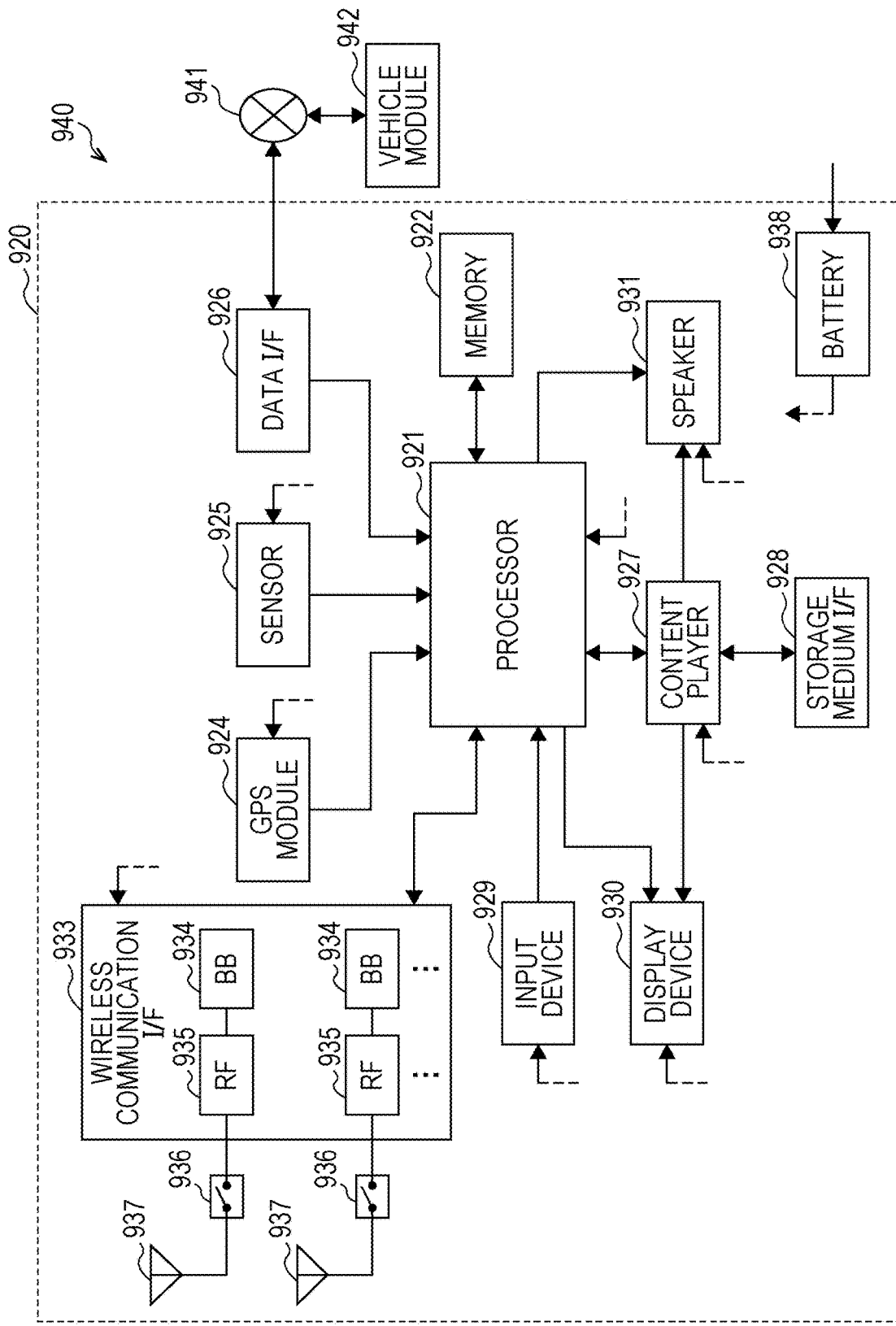
FIG. 28 is a block diagram illustrating an example of a schematic configuration of a car navigation device to which the technology according to the present disclosure is applied.

FIG. 28 is a block diagram illustrating an example of a schematic configuration of a car navigation device 920 to which the technology according to the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation device 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation device 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 28. Note that FIG. 28 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation device 920 may include a plurality of antennas 937 as illustrated in FIG. 28. Note that FIG. 28 illustrates an example in which the car navigation device 920 includes a plurality of antennas 937, but the car navigation device 920 may include a single antenna 937.

Further, the car navigation device 920 may include the antenna 937 for each wireless communication system. In this case, the antenna switch 936 may be omitted from a configuration of the car navigation device 920.

The battery 938 supplies electric power to each block of the car navigation device 920 illustrated in FIG. 28 via a feeder line that is partially illustrated in the figure as a dashed line. Further, the battery 938 accumulates the electric power supplied from the vehicle.

One or more constituent elements (the acquisition unit 241 and/or the communication processing unit 243) included in the control unit 240 described with reference to FIG. 10 may be implemented in the wireless communication interface 933 in the car navigation device 920 shown in FIG. 28. Alternatively, at least some of these constituent elements may be implemented in the processor 921. As an example, the car navigation device 920 may be equipped with a module including a part (for example, the BB processor 934) or all of the wireless communication interface 933 and/or the processor 921, so that the one or more constituent elements described above may be implemented in the module. In this case, the above-described module may store a program for causing a processor to function as the one or more constituent elements (in other words, a program for causing the processor to perform the operation of the one or more constituent elements), and may execute the program. As another example, a program for causing a processor to function as the one or more constituent elements may be installed in the car navigation device 920 and executed by the wireless communication interface 933 (for example, the BB processor 934) and/or the processor 921. As described above, the car navigation device 920 or the above-described module may be provided as an apparatus including the one or more constituent elements. Alternatively, a program for causing a processor to function as the one or more constituent elements may be provided. Moreover, a readable recording medium on which the above-described program has been recorded may be provided.

Furthermore, for example, the wireless communication unit 220 described with reference to FIG. may be implemented in the wireless communication interface 933 (for example, the RF circuit 935) in the car navigation device 920 shown in FIG. 28. In addition, the antenna unit 210 may be implemented on the antenna 937. Furthermore, the storage unit 230 may be implemented in the memory 922.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

<3. Conclusion>

As described above, according to the embodiment of the present disclosure, the terminal device 200 which can reliably detect a downlink without using a CRS and the base station device 100 which causes the terminal device 200 to reliably detect a downlink are provided.

It is possible to create a computer program for causing hardware such as a CPU, ROM, and RAM built into each device to exhibit functions that are substantially the same as the configuration of each device described above. Further, it is also possible to provide a storage medium having the computer program stored therein. Additionally, by configuring each of the function blocks illustrated in the function block diagrams as hardware, the series of processes may also be achieved by hardware.

The preferred embodiment(s) of the present disclosure has/have been described above with reference to the accompanying drawings, whilst the present disclosure is not limited to the above examples. A person skilled in the art may find various alterations and modifications within the scope of the technical idea described in the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present disclosure may also be configured as below.

(1)

A wireless communication device including:
- a communication unit configured to perform wireless communication using an unlicensed band; and
- a detecting unit configured to detect a downlink on the basis of a second downlink signal different from a first downlink signal which is periodically transmitted,
- in which the detecting unit starts PDCCH monitoring after detecting a downlink.

(2)

The wireless communication device according to (1), in which the second downlink signal is a preamble signal to be transmitted in a head of a downlink.

(3)

The wireless communication device according to (2), in which the preamble signal is transmitted in every symbol.

(4)

The wireless communication device according to (2), in which the preamble signal is transmitted once every a plurality of symbols.

(5)

The wireless communication device according to (2), in which the preamble signal is transmitted only once in a head of a downlink.

(6)

The wireless communication device according to (2), in which the preamble signal is transmitted a plurality of times within a channel occupancy time.

(7)

The wireless communication device according to (6), in which the preamble signal is transmitted in a head of a slot.

(8)

The wireless communication device according to (6), in which the preamble signal is transmitted in a middle of a slot.

(9)

The wireless communication device according to (2), in which the preamble signal includes one type of a sequence and one symbol.

(10)

The wireless communication device according to (2), in which the preamble signal includes a combination of two or more types of sequences.

(11)

The wireless communication device according to (10), in which the preamble signal includes two or more symbols and all symbols are arranged in a frequency domain in an interlaced manner.

(12)

The wireless communication device according to (10), in which the preamble signal includes two or more symbols, and part of symbols are arranged in a frequency domain in an interlaced manner.

(13)

The wireless communication device according to (10), in which the preamble signal includes two or more types of sequences which are alternately arranged.

(14)

The wireless communication device according to (10), in which the preamble signal includes one sequence arranged near a center frequency of a carrier, and other sequences arranged in other regions.

(15)

The wireless communication device according to (2), in which an SS/PBCH block is used as the preamble signal.

(16)

The wireless communication device according to (1), in which the second downlink signal is a CSI-RS.

(17)

The wireless communication device according to (1), in which the second downlink signal is an SSS.

(18)

The wireless communication device according to (1), in which the second downlink signal is set as one of RLM-RSs.

(19)

A wireless communication device including:
a communication unit configured to perform wireless communication using an unlicensed band; and
a communication control unit configured to cause a second downlink signal different from a first downlink signal which is periodically transmitted, to be transmitted from the communication unit,
in which PDCCH monitoring is caused to be performed after a downlink is detected on the basis of the second downlink signal.

(20)

The wireless communication device according to (19), in which the second downlink signal is a preamble signal to be transmitted by the communication unit in a head of a downlink.

(21)

A wireless communication method including:
performing wireless communication using an unlicensed band;
detecting a downlink on the basis of a second downlink signal different from a first downlink signal which is periodically transmitted; and
starting PDCCH monitoring after detecting a downlink.

(22)

A wireless communication method including:
performing wireless communication using an unlicensed band;
causing a second downlink signal different from a first downlink signal which is periodically transmitted, to be transmitted; and
causing PDCCH monitoring to be performed after a downlink is detected on the basis of the second downlink signal.

(23)

A computer program for causing a computer to execute a process including:
performing wireless communication using an unlicensed band;
detecting a downlink on the basis of a second downlink signal different from a first downlink signal which is periodically transmitted; and
starting PDCCH monitoring after detecting a downlink.

(24)

A computer program for causing a computer to execute a process including:
performing wireless communication using an unlicensed band;
causing a second downlink signal different from a first downlink signal which is periodically transmitted, to be transmitted; and
causing PDCCH monitoring to be performed after a downlink is detected on the basis of the second downlink signal.

REFERENCE SIGNS LIST

100 Base station device
200 Terminal device

The invention claimed is:

1. A wireless communication device comprising:
a transceiver; and
control circuitry configured to control the transceiver to perform wireless communication using an unlicensed band, the wireless communication comprising:
  detecting a downlink based on two downlink signals that are each different from a periodically transmitted cell specific reference signal (CRS): and
  based on detecting the downlink, monitoring for and detecting a Physical Downlink Control Channel (PDCCH);
wherein the two downlink signals comprise:
  a preamble signal located within a head of a first slot of a channel occupancy time (COT) of the downlink signal, the downlink signal having a transmission cycle that is independent of a transmission cycle of the PDCCH, the preamble signal being an aperiodic preamble signal or a periodic preamble signal, the preamble signal including a cell ID, a beam ID and an operator ID, and
  one of a Channel State Information-Reference Signal (CSI-RS) or a Radio Link Monitoring-Reference Signal (RLM-RS),
  wherein the preamble signal located within the head of the first slot of the COT of the downlink signal includes a first symbol corresponding to a first symbol type and a second symbol corresponding to a second symbol type different from the first symbol type, the first and second symbols arranged within the head of the first slot of the COT of the downlink signal in a predetermined pattern.

2. A wireless communication method performed by a device that includes a transceiver and control circuitry, the method comprising:
performing wireless communication using an unlicensed band, the wireless communication comprising:
detecting a downlink based on two downlink signals that are each different from a periodically transmitted cell specific reference signal (CRS); and
based on detecting the downlink, monitoring for and detecting a Physical Downlink Control Channel (PDCCH);
wherein the two downlink signals comprise:
a preamble signal located within a head of a first slot of a channel occupancy time (COT) of the downlink signal, the downlink signal having a transmission cycle that is independent of a transmission cycle of the PDCCH, the preamble signal being an aperiodic preamble signal or a periodic preamble signal, the preamble signal including a cell ID, a beam ID and an operator ID, and
one of a Channel State Information-Reference Signal (CSI-RS) or a Radio Link Monitoring-Reference Signal (RLM-RS),
wherein the preamble signal located within the head of the first slot of the COT of the downlink signal includes a first symbol corresponding to a first symbol type and a second symbol corresponding to a second symbol type different from the first symbol type, the first and second symbols arranged within the head of the first slot of the COT of the downlink signal in a predetermined pattern.

3. A non-transitory computer product including a computer program for causing a computer to execute a process comprising:
performing wireless communication using an unlicensed band, the wireless communication comprising:
detecting a downlink based on two downlink signals that are each different from a periodically transmitted cell specific reference signal (CRS); and
based on detecting the downlink, monitoring for and detecting a Physical Downlink Control Channel (PDCCH);
wherein the two downlink signals comprise:
a preamble signal located within a head of a first slot of a channel occupancy time (COT) of the downlink signal, the downlink signal having a transmission cycle that is independent of a transmission cycle of the PDCCH, the preamble signal being an aperiodic preamble signal or a periodic preamble signal, the preamble signal including a cell ID, a beam ID and an operator ID, and
one of a Channel State Information-Reference Signal (CSI-RS) or a Radio Link Monitoring-Reference Signal (RLM-RS),
wherein the preamble signal located within the head of the first slot of the COT of the downlink signal includes a first symbol corresponding to a first symbol type and a second symbol corresponding to a second symbol type different from the first symbol type, the first and second symbols arranged within the head of the first slot of the COT of the downlink signal in a predetermined pattern.

* * * * *